(12) United States Patent      (10) Patent No.: US 12,505,075 B2
Cheriton      (45) Date of Patent: Dec. 23, 2025

(54) AUTOMATIC APPROXIMATING REFINEMENT OF RULESET FROM LABELLED DATASETS

(71) Applicant: OptumSoft, Inc., Vero Beach, FL (US)

(72) Inventor: David R. Cheriton, Vero Beach, FL (US)

(73) Assignee: OptumSoft, Inc., Vero Beach, FL (US)

(*) Notice: Subject to any disclaimer, the term of this patent is extended or adjusted under 35 U.S.C. 154(b) by 0 days.

(21) Appl. No.: 18/653,832

(22) Filed: May 2, 2024

(65) Prior Publication Data

US 2024/0370413 A1     Nov. 7, 2024

Related U.S. Application Data

(60) Provisional application No. 63/463,986, filed on May 4, 2023.

(51) Int. Cl.
*G06F 16/00* (2019.01)
*G06F 16/21* (2019.01)
*G06F 16/28* (2019.01)

(52) U.S. Cl.
CPC ............ *G06F 16/21* (2019.01); *G06F 16/285* (2019.01)

(58) Field of Classification Search
CPC ............. G06F 3/04847; G06F 3/04842; G06F 3/0481; G06N 3/08; G06N 20/10; G06N 5/02
See application file for complete search history.

(56) References Cited

U.S. PATENT DOCUMENTS

| | | |
|---|---|---|
| 2018/0241668 A1 | 8/2018 | Han |
| 2019/0244113 A1* | 8/2019 | Ramos ................ G06F 3/04847 |
| 2020/0210870 A1 | 7/2020 | Flor |
| 2021/0264287 A1 | 8/2021 | Gardner |
| 2022/0335300 A1 | 10/2022 | Ben-Itzhak |

OTHER PUBLICATIONS

Eineborg et al. Classifying Uncovered Examples by Rule Stretching. Jan. 2001.
Fürnkranz et al. A Brief Overview of Rule Learning. Aug. 2015.

\* cited by examiner

*Primary Examiner* — Yicun Wu
(74) *Attorney, Agent, or Firm* — Van Pelt, Yi & James LLP

(57) ABSTRACT

A labelled point within a multidimensional space is input from a set of input records. It is determined whether the labelled point is subsumed by a member hyperregion of the set of hyperregions specified by an BSRS, wherein the BSRS includes a boundary-structured rule corresponding to a hyperregion in the multidimensional space. In the event the labelled point is not subsumed, the BSRS is expanded or the labelled point is eliminated.

26 Claims, 17 Drawing Sheets

AUTOMATIC APPROXIMATING REFINEMENT OF RULESET FROM LABELLED DATASETS

CROSS REFERENCE TO OTHER APPLICATIONS

This application claims priority to U.S. Provisional Patent Application No. 63/463,986 entitled AUTOMATIC APPROXIMATING REFINEMENT OF RULESET FROM LABELLED DATA SETS filed May 4, 2023 which is incorporated herein by reference for all purposes.

BACKGROUND OF THE INVENTION

Various applications require mapping from multiple input values to an output value, such as in classification and/or decision making. It would be an improvement to provide such mapping practically, in part to use less computing resource, including less processing resource, less storage resource, and/or less network resource, and/or lower design times and/or lower runtimes for the mapping application.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Mapping from multiple input values to an output value, such as in classification and decision making, is disclosed.

Figure 1:
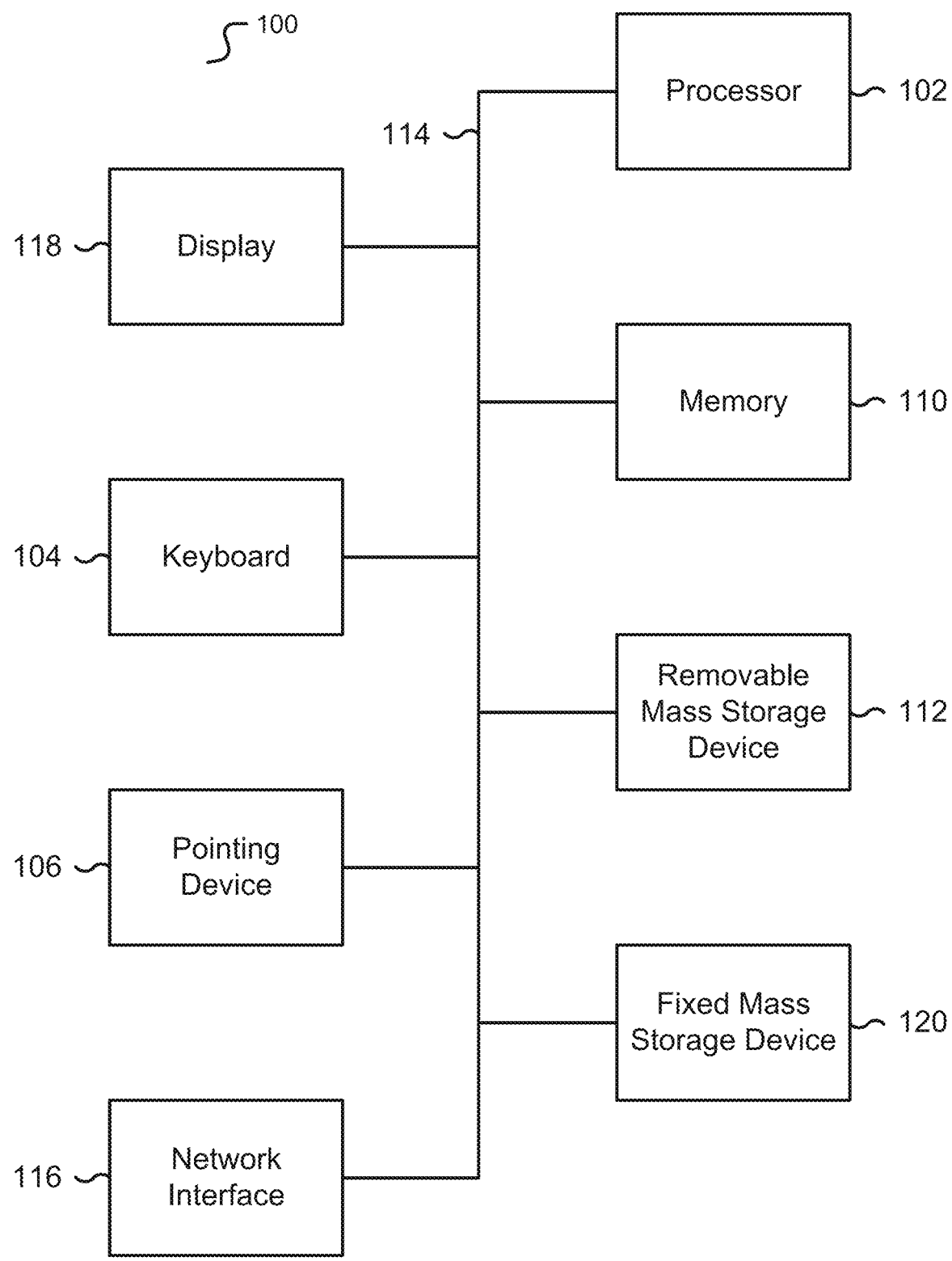
FIG. 1 is a functional diagram illustrating a programmed computer/server system for mapping in accordance with some embodiments.

FIG. 1 is a functional diagram illustrating a programmed computer/server system for mapping in accordance with some embodiments. As shown, FIG. 1 provides a functional diagram of a general-purpose computer system programmed to provide mapping in accordance with some embodiments. As will be apparent, other computer system architectures and configurations can be used for mapping.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data, and objects used by the processor 102 to perform its functions, for example, programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read-only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storages 112, 120 generally store additional programming instructions, data, and the like that typically are not in active use by the processor 102. It will be appreciated that the information retained within mass storages 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio input device, audio card, speakers, a touch (or pointing) device, and/or other subsystems as needed. Besides a touch screen, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification, "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous and/or heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Determining mapping with multiple input values may be complex. For example, consider realizing a predictive model of a chemical process as a time-stepped computer simulation. The state of the process at the next state is dependent on a large number of parameter values corresponding to its current state. If there are K such parameters, the mapping is one that maps K parameters to M output values, typically corresponding in part to the expected values of these parameters in the next timestep as well as simulation outputs.

In many cases, there may be no known closed form formula to compute output values from input values. A closed form formula normally relies on the mapping being "continuous" in the mathematical sense. However, in many practical applications, there may be singularities violating said continuity requirement. Moreover, many closed form formulae make assumptions that are not strictly true in a real/practical system. For example, a formula may assume the friction is constant or linear, which may not be true.

In many applications, it may be feasible to generate a labelled data set from the domain of interest, such as that for an aircraft, seacraft, landcraft, or similar engineered system or from entities in its expected environment, by collecting telemetry data from sensors connected to the system of interest. The labelled data set includes a set of records in which each record indicates specific values for the relevant parameters, often at a designated time and the label characterizes or categorizes these parameter values. The data set may be generated in part by instrumenting the actual system and collecting the data from running the system under different circumstances or conditions. The data set may also be collected in part by collecting the same data from a detailed simulation of the target system. A labelled data set may also in part be produced by designating one or more of the input attributes as producing a label and treating the remaining attributes as the inputs.

In these applications, various traditional techniques may be used to generate a hyperplane as a decision boundary that divides the entire space into two regions with one region having one associated label and the other having the remaining label or labels. The processing is repeated as necessary on the latter region to subdivide that region until there is a single label associated with each region. However, this traditional approach suffers from overfitting, underfitting, non-linear decision boundaries, and/or increased cost/reduced performance with increased dimensionality. This approach "fits" the hyperplane to the data by adjusting weights to find the hyperplane that maximizes the distance between differently labelled data points. This "fit" may mean that the mapping outputs the correct label when invoked with input values contained in a record with those data values. However, there is no guarantee for the correctness of the label for values for input data that is not in the training input data. Because traditional techniques use high-order continuous functions for this mapping as well as kernel functions, it is infeasible to predict even approximately what the fitted mapping is going to output for values outside of the training set.

Figure 2:
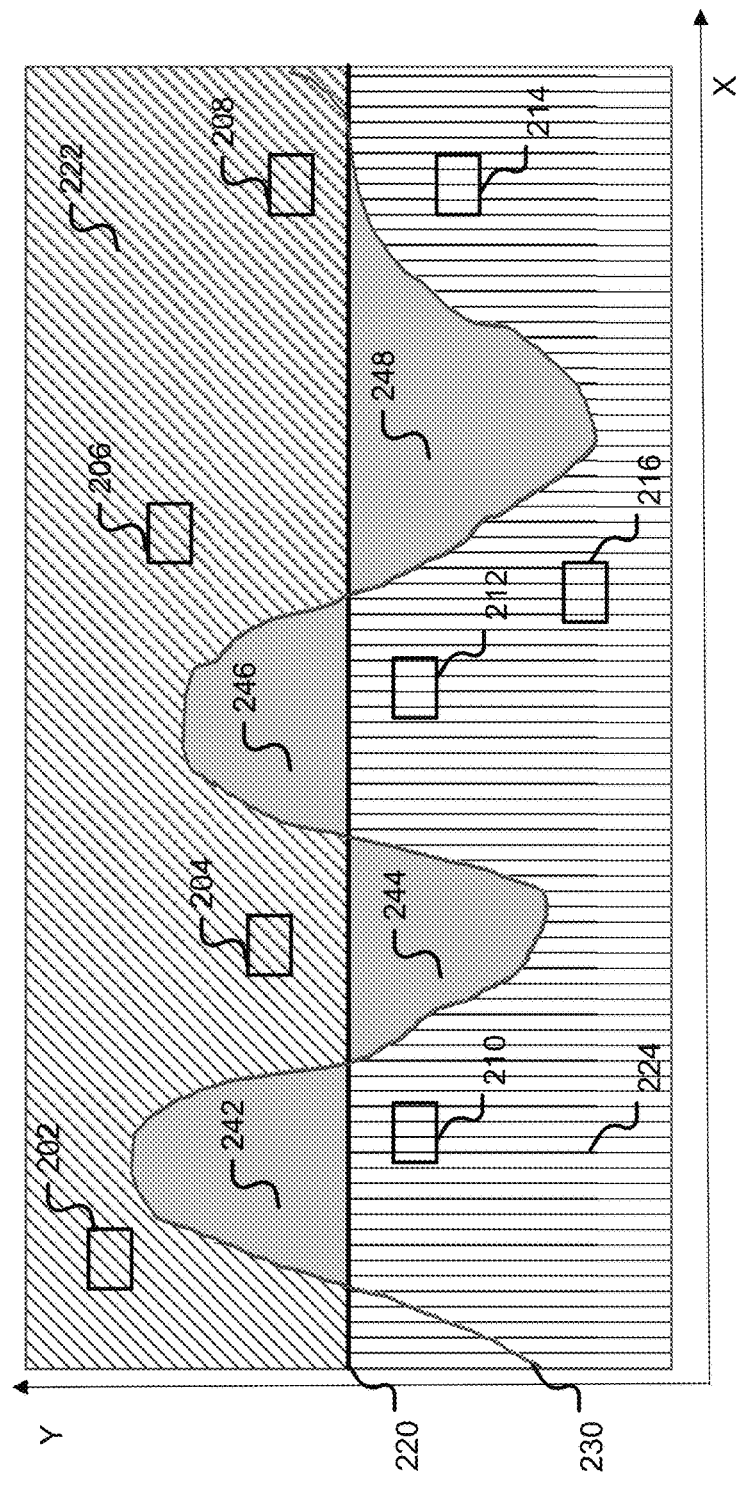
FIG. 2 is a diagram illustrating an example of traditional mapping.

Traditional Machine Learning/Artificial Intelligence. FIG. 2 is a diagram illustrating an example of traditional mapping. In FIG. 2, a set of labelled points and/or classified points (202), (204), (206), (208), (210), (212), (214), and (216) are depicted from an input data set and/or set of input records. Without limitation, the labelled points/set of input records of FIG. 2 are shown within a two-dimensional space with two parameters "X" and "Y".

The labelled points each have a label associated with it, depicted in FIG. 2 as either a label of "diagonal shading" (202), (204), (206), and (208), or a label of "vertical shading" (210), (212), (214), and (216). In the example shown in FIG. 2, a simple underlying natural/physical/engineered mapping is that any point above the horizontal line/physical classifier (220) maps to "diagonal shading" and any point below the horizontal line (220) maps to "vertical shading."

In traditional techniques, for example the "machine learning problem", training is performed on the set of input records (202), (204), (206), (208), (210), (212), (214), and (216) to infer a label for future input points. For example, in machine learning, a complex collection of neurons may adjust balances until a consistency with the input data points (202), (204), (206), (208), (210), (212), (214), and (216) is met, represented in FIG. 2 as the machine learning classifier (230), so that future input points above machine learning classifier (230) are mapped as "diagonal shading" and future input points below the machine learning classifier (230) are mapped as "vertical shading."

As can be seen in FIG. 2, a misclassification or mislabeling error occurs in the areas between the physical classifier (220) and machine learning classifier (230) depicted in areas (242), (244), (246), and (248) in FIG. 2. That is, if a future input point is within such areas, for example area (242), the machine learning technique would label this as "vertical shading" when the underlying natural/physical/engineered nature should be "diagonal shading". Thus, as shown in FIG. 2, incorrect labels may result from using traditional fitting, for example machine learning artificial intelligence (AI) approaches.

It may be challenging or impossible to a priori determine a bound on the mislabeling error with a mapping produced using traditional machine learning/AI. Furthermore, many traditional techniques also require a complete regeneration of the mapping when additional labelled input data is available, rather than allowing incremental refinement.

In many applications, absolute precision may not be necessary. For example, using input values of features on a manufacturing equipment to classify whether it is about to fail or failing, it may be acceptable to have a small number of false positives given that a positive indication from generated rules allows a technician to do further assessment. The technician may focus on just those pieces of equipment that are classified as possibly failing. This is a substantive improvement over the technician having to periodically examine all pieces of equipment. Moreover, an input data set/set of input records may have some degree of error in the data because of inaccuracy in the sensor readings. Furthermore, if the size of the data set does not fully cover the total input space of possible value combinations, which is normally infeasible, it may not be possible to determine the completely accurate mapping between labels and data. Therefore, generating rules that provide an approximately accurate mapping without absolute precision remains useful, provided that the approximation error may be bounded.

An automated means to refine a reliable approximate mapping from K inputs to outputs using a training input data set/set of input records is disclosed. A reliable bound on how approximate and/or how inaccurate the mapping is relative to the input training sets may be provided. As referred to herein, the term refine includes full generation because the disclosed techniques may start with the null mapping/ruleset and refine it to include one or more mappings/rules it generates from the set of input records.

Figure 3:
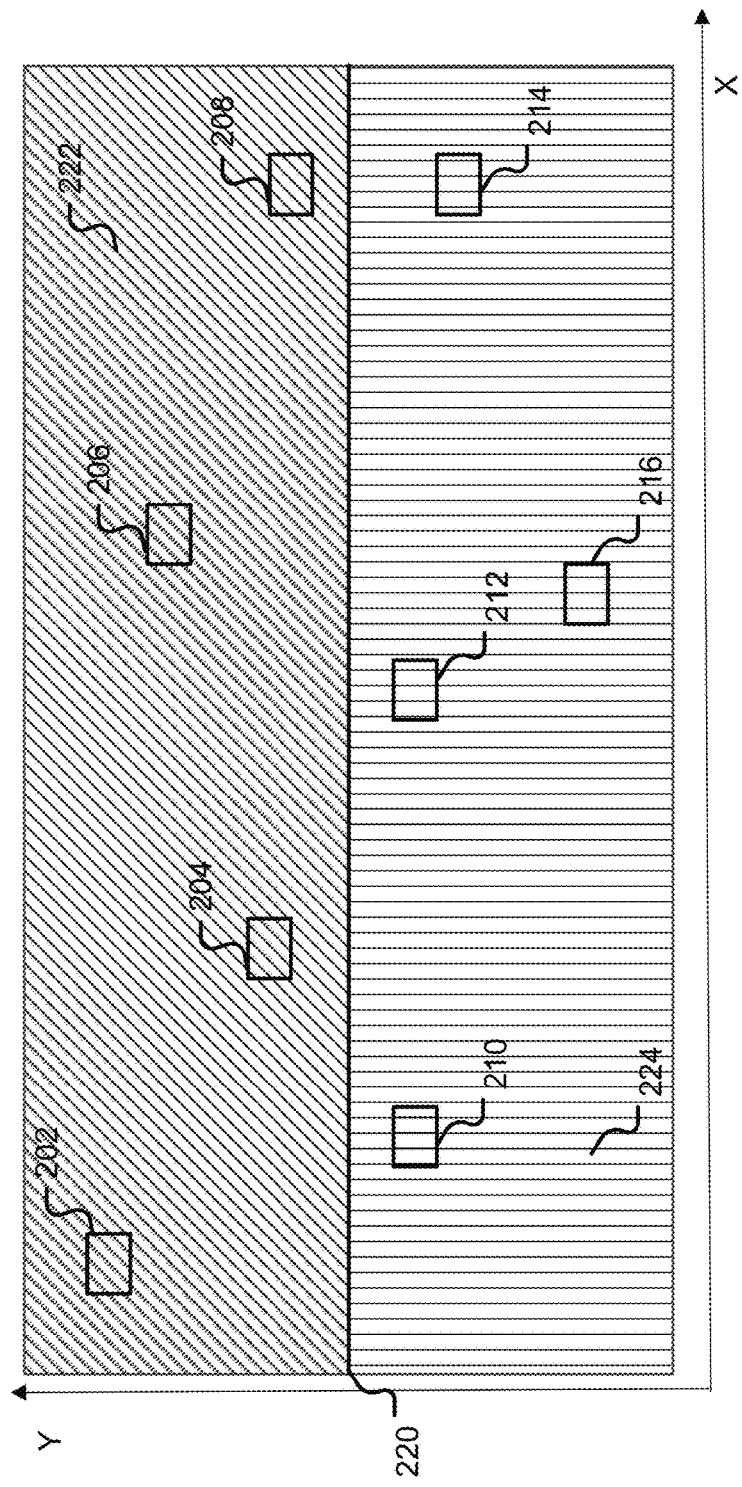
FIG. 3 is a diagram illustrating an example of boundary-structured representation.

Boundary-Structured Representation. FIG. 3 is a diagram illustrating an example of boundary-structured representation (BSR). As shown in the example of FIG. 3, the input data set points (202), (204), (206), (208), (210), (212), (214), and (216) and physical mapping (220) is similar to that depicted in FIG. 2.

A region as referred to herein is an enclosed geometric volume, for example a three dimensional region is an enclosed space. As referred to herein, a hyperregion of an N-dimensional space is the labelled set of all the N-dimensional points enclosed by a specific boundary. In a degenerate case, a hyperregion consists of a single N-dimensional point. The prefix "hyper" is used to indicate that the space and/or region may be of an arbitrary dimension, not just 2 or 3. As referred to herein, a boundary is specified by one or more boundary-structured rules.

In one embodiment, a boundary-structured ruleset (BSRS) is refined by converting the rules in the BSRS into subregions in a K-dimension space and then reading in a training set of input records with K corresponding attributes per record plus a label, by converting each input record into a K-dimensional subregion, expanded according to application-specific approximation bounds, merging subregions into existing regions by adjusting these existing regions and/or forming new regions, and outputting each resulting set of labelled subregions as a refined ruleset. In a special case of having no pre-existing ruleset, the BSRS to be refined may be defined as the nullset or a single rule that maps the entire input domain to a default label.

This may be viewed as interpreting each labelled input record as a rule which defines a labelled subregion in the K-dimensional space, and then adding or merging these "input" subregions into expanded K-dimensional subregions, thereby being able to output a ruleset that comprises a smaller number of rules than the number of input data set records, while providing coverage beyond the data points specified in the labelled input data. In a sense it is expanding the bounding geometry or geometries of the input rules for coverage, consistent with the rest of the set of input records, while merging multiple expanded subregions when the merged subregion may be represented by one or more boundary-structured rules in the boundary-structured rule system being used and the merged subregion is consistent with the approximation bounds. As referred to herein, the term subregion is used instead of region to indicate that the defined region is not necessarily a final version from the standpoint of a final output.

As referred to herein, a boundary-structured rule is a rule with an antecedent that specifies a bounding geometry that defines and encloses a subregion in the K-dimensional input space and whose consequent similarly specifies a bounding geometry that defines and encloses a subregion in the M-dimensional output space. In effect, a boundary-structured rule indicates that each data point within the bounding geometry of its antecedent/its subregion maps to a point in the bounding geometry of its consequent. A bounding geometry may indicate a single point as well as a multi-point subregion. A boundary-structured rule may match to data points in a multiplicity of disjoint subregions by its antecedent corresponding to the disjunction of boundary specification for each of these subregions. As referred to herein, expanding a subregion means modifying the boundary of the subregion to enclose additional points. Expanding a boundary-structured rule means modifying the rule to specify an expanded corresponding boundary. Expanding a boundary-structured ruleset means expanding a rule in the rule set or adding a new boundary-structured rule to the ruleset, or both.

A ruleset of boundary-structured rules defines in part a mapping from the input parameter space to the output result space of the mapping. In particular, when the mapping is invoked with a given set of parameter values, the rules are evaluated and, for each rule whose antecedent evaluates to true, that is the parameter values are contained in the subregion defined by the antecedent, the consequent contributes directly or indirectly to the output result.

For simplicity of description but without loss of generality or limitation, as described below a label is described as corresponding to a single attribute. For example, the label may indicate the expected change in temperature, given the values of other attributes in the input record. In a classification data set for fault conditions, the label value may indicate the category of risk associated with the faults. This single label value may be assumed without loss of generality for several reasons. First, multiple separate values may be presented as an M-tuple or a compound value, that is a combination of these separate values. For example, a label may designate a record containing particular values for all three of temperature, pressure and humidity. The approximation bound may be computed on these individual subattributes. Alternatively, a mapping to M output values may be provided by applying the disclosed techniques to generate an approximating ruleset-based mapping for each of the M output values separately. Then, the M separate rulesets may be combined to produce a ruleset that maps to these M separate attributes on each rule evaluation cycle. As separate attributes, there is no conflict between the M separate results.

Boundary-Structured Rule Representation. There are different means for specifying bounding geometries in boundary-structured rules. For example, a range-structured rule is a boundary-structured rule where the bounding geometry is an axis-aligned hyperrectangle or orthotope. Therefore, there is a clause for each dimension and each clause indicates a minimum and a maximum value for the dimension/attribute associated with this dimension.

For example, stoveFaults[0,3) AND pilotLight[10,20) AND gasFlow[4,9)→stoveReady is a boundary-structured rule where stoveReady is a data point (enumeration value or category) in the output/result space and it is mapped to by data points in the subregion where the stoveFaults, pilotLight and gasFlow are all within the limits specified in the antecedent. This boundary structured rule may be translated into a labelled region of a space with dimensions, stoveFaults, pilotLight and gasFlow containing all points that have stoveFaults dimension value in the subregion [0,3), pilotLight value in the range [10,20) and gas Flow value in the range [4,9). In a notation used herein, a range specified as [threshold0,threshold1) indicates a value greater than or equal to threshold0 and strictly less than threshold 1. Therefore, if an attribute is an enumeration of possible states, and 1 is the numeric designation of normal operation, the range [1,2) is a range designation of the value 1. In general, a range-structured rule with K clauses in its antecedent, each associated with a different dimension, defines a K-dimensional bounding geometry that is a K-dimensional hyperrectangle.

Continuing the above example, the inverse rule:

stoveReady→stoveFaults(0,3) AND pilotLight[10,20) AND gasFlow[4,9)

is also a boundary-structured rule where stoveReady is a data point, such as an enumeration value or category, in the input parameter space and mapping to a subregion where the stoveFaults, pilotLight, and gas Flow are all within the limits specified in the consequent.

In one embodiment, a range-structured rule is converted and/or translated to a labelled K-dimensional subregion, referred to herein as a hyperrectangle, and a labelled axis-aligned hyperrectangle may be converted and/or translated to a range-structured rule. As well, a range-structured rule may correspond to a multiplicity of subregions by having its antecedent be a disjunction of conjunctive clauses, one for each subregion.

In one embodiment, an alternate means of representation of boundary-structured rules, a bounding geometry is represented as the vector representation of a convex polytope, that is, a set of K-dimensional extreme points. This allows for a more flexible definition of a bounding geometry, because every hyperrectangle is a convex polytope but not vice versa. However, it also may make it more expensive to determine if a data point is contained within a given convex polytope and/or for related operations such as intersection. With the vector representation of a convex polytope, a boundary-structured rule in this representation that is equivalent to a single data point is realized by the value for each dimension D being repeated in dimension D component of each of the extreme points.

Besides specifying a hyperrectangle or a vector representation of a convex polytope, there are without limitations alternate ways to specify a bounding geometry for a K-dimensional space. For clarity purposes, as described herein a hyperrectangle may be used for example, but other representations may be used without limitation. Convex bounding geometries may be generally more efficient to determine overlap, intersections and expansions of the geometry with convex ones, but non-convex geometries may be used alternately without limitation.

A boundary-structured rule system as described herein is a system with a rule evaluator that is able to determine whether an input data point falls within the bounding geometry specified in the rule antecedents and whether two bounding geometry specifications intersect. That is, a boundary-structured rule system restricts the specification of boundaries and thus bounding geometries so that it is able to evaluate the rule antecedents efficiently. These restrictions restrict what bounding geometries may be represented as for the given boundary-structured rule system. For example, a range-structured rule system may be a boundary-structured rule system that only represents axis-aligned hyperrectangles in its antecedent and consequent.

Figure 4:
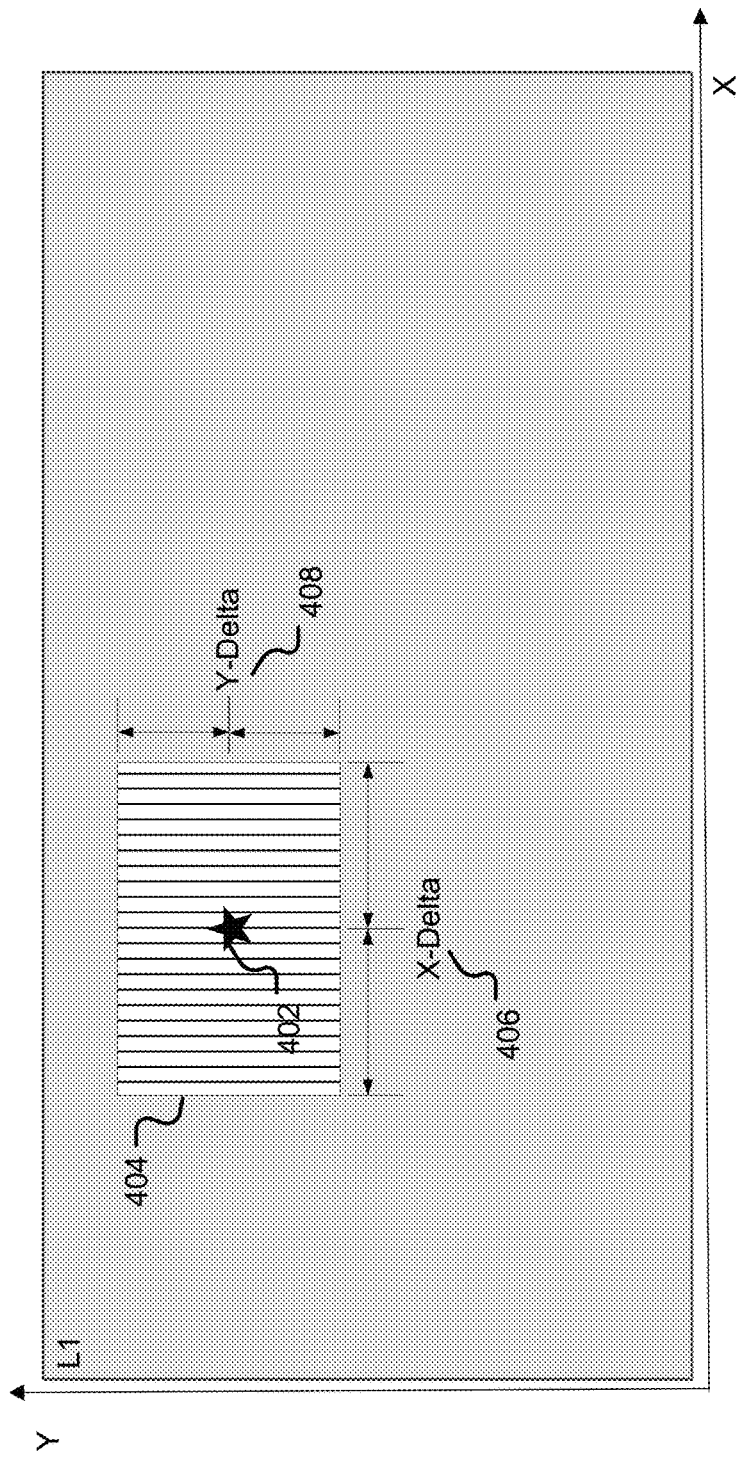
FIG. 4 is a diagram illustrating an example of conversion from a labelled point to a point boundary-structured representation.

FIG. 4 is a diagram illustrating an example of conversion from a labelled point to a point boundary-structured representation. As shown in the example of FIG. 4, the two-dimensional X-Y axis, where K=2, is similar to that depicted in FIG. 2.

An input data point from a system such as that shown in FIG. 4 is located in a K-dimensional subregion of non-trivial size such that it has the same or similar consequent for most points within this subregion. This conversion/translation to a subregion is illustrated for the simple two-dimensional case in FIG. 4. Here, the star (402) indicates the actual data point and the surrounding rectangle (404) indicates the area around the data point that has the same label because of this local statistical smoothness or local continuity property. The rest of the area depicted in FIG. 4 is labelled as "L1".

Conversion of Set of Input Records to Labelled Subregions as Boundary-structured Rules. The set of input records may be assumed or required to be structured as a sequence of records where each record is in the form of a label value and a sequence of values that are each associated with an attribute and/or feature, wherein an attribute or feature is referred to herein as an input parameter. It is further assumed there is attribute information for each attribute that provides an indication of minimum and maximum values for that attribute. It also includes approximation bound as an indication of accuracy, such as required accuracy. For example, a temperature sensor may provide a 16-bit data value as its reading. However, the full range may be restricted to just from −40 to 120 degrees with an accuracy of +/−0.10 degrees. A 16-bit value received from the sensor may indicate the temperature in hundreds of degrees relative to −40 degrees. Then, the value of temperature may be translated into a range [value−0.10,value+0.10). Depending on accuracy characteristics, the actual range used in the dimension for this resulting subregion may be expanded.

Consequently, an input record that is necessarily a single data point is translated into a labelled subregion in K-dimensional space. This K-dimensional subregion is non-trivial, that is it has non-zero volume, because of the allowed approximation bounds on each dimension, as illustrated in FIG. 4. In FIG. 4, a two-dimensional data point is translated into a two-dimensional labelled subregion for a hyperrectangle-structured rule system by expansion on both dimensions. The approximation bound is given by a maximum delta to the dimensions, such as that shown as X and Y in FIG. 4. The X-dimension of the data point is translated to a range from [x−deltaX,x+deltaX) as shown as element (406) in FIG. 4. The Y-dimension of the data point is translated to a range from [y−deltaY,y+deltaY) as shown as element (408) in FIG. 4.

The approximation bounds may represent both potential inaccuracy in the input data and/or a range across which the difference in value does not normally matter. On the latter, for example, the ambient temperature may be measured to 0.10 degrees but for the system being measured, the value of ambient temperature may not normally matter within 5 degrees higher or lower. Therefore, the approximation bound may be specified as plus or minus 5 degrees.

In one embodiment, the approximation bound is provided in various different forms. One form is a function that returns approximation bounds above and below the specified value based on the entire input record.

It is assumed and required that there is a value for each attribute in an input record. This value may indicate a "don't care" value, indicating that the label is true for any possible corresponding attribute value. Preprocessing may fill in a likely value or a default value if the value is not otherwise known.

A boundary-structured rule may be converted to a labelled subregion by defining a subregion in K-dimensional space that has its boundary corresponding to that specified by this rule and label on the subregion matching that of the rule consequent.

The labelled subregion representation may be stored separately from its rule representation but, if so, in such embodiments there is an automatic way to convert and/or translate the labelled subregion representations to rule representation, and rule representation to labelled subregion representation, without significant error. In an alternate embodiment, the labelled subregion representation is just an internal representation, such as a list of ranges and a label, that may be regarded as a labelled subregion or a boundary-structured rule.

Local Statistical Smoothness. For many applications, particularly those working with engineered and/or physical systems, the underlying natural mechanisms provide piecewise continuous behavior and smoothness as defined in the mathematical sense. Therefore, for a given mapping and a data point (DP) defined by one or more input parameter values, many nearby data points in the K-dimensional space map to approximately the same output result, that is, to output data points that are near to that mapped to by the DP. This is referred to herein as local statistical smoothness because most, but not all, data points near most data points may be similar to that data point in label.

In one embodiment, if two subregions with the same, or approximately the same, label match or overlap on one dimension and approximately match on the other dimensions, the two subregions may be merged into one subregion. In part, this is because that otherwise, the system may exhibit non-continuous or highly dynamic behavior between these data points, challenging the local statistical smoothness assumption. This in some sense is analogous to stating the behavior is approximately transitive; that is, if input I1 is "close" to input I2 and input I2 is "close" to I3, then I1 is "close" to I3, where close as referred to herein is that A is close to B when A and B are within the approximation bounds to the actual system being characterized. However, two subregions with different labels may be adjacent to indicate a discontinuity across their adjacent boundary, potentially curtailing this expansion.

Figure 5:
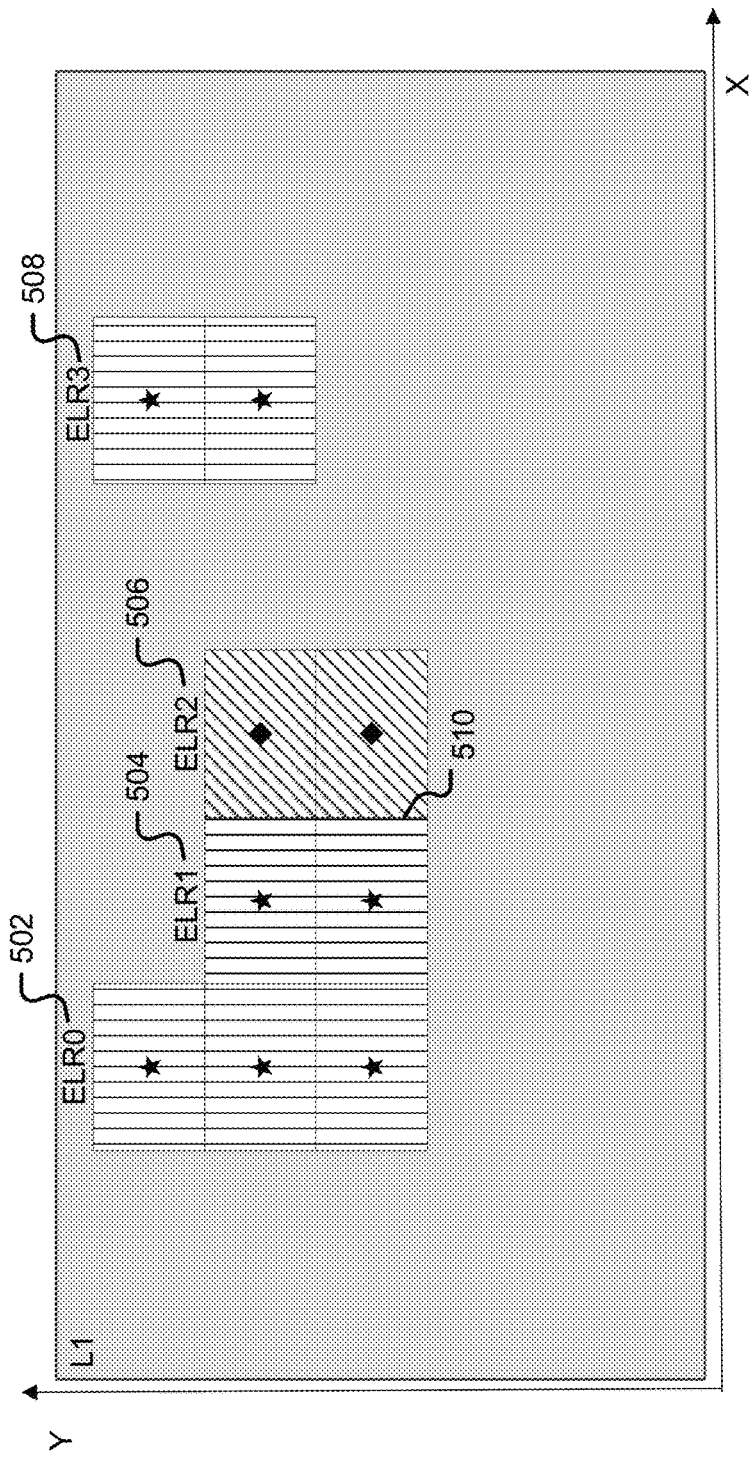
FIG. 5 is a diagram illustrating an example of conversion to expanded labelled regions.

FIG. 5 is a diagram illustrating an example of conversion to expanded labelled regions. As shown in the example of FIG. 5, the two-dimensional X-Y axis, where K=2, is similar to that depicted in FIG. 2. Transitivity and discontinuity is illustrated in FIG. 5. Existing and/or expanded labelled subregions ELR0 (502), ELR1 (504), ELR2 (506), and ELR3 (508) are each a subregion subsumed and/or merged from two or three separate data points, and are labelled "diagonal shading" for ELR2 (506) or "vertical shading" for ELR0 (502), ELR1 (504), and ELR3 (508). The remainder of the area is labelled as "L1". ELR2 (506)'s different label indicates an inconsistency and/or discontinuity (510) between the ELR1 (504) subregion and the ELR2 (506) subregion along the X axis. As depicted in FIG. 5, ELR3 (508) is too far from ELR0 (502) and ELR1 (504) to be merged with those subregions.

In one embodiment, a ruleset may cover the input domain by providing a boundary-structured rule for each different "piece" or subregion that corresponds to this piece-wise continuous behavior, that is, each subregion exhibits relatively "smooth" behavior, wherein smooth as described herein refers to behavior that is continuous and approximately the same. There may be multiple subregions with the same label, as shown with ELR3 (508) and ELR0 (502).

A mapping that is approximately correct within some approximation bound is sufficient for many practical applications. For instance, in a control application, the input state is constantly changing so control actions are taken periodically. If the control action undercorrects on one timestep because of this approximation, it may compensate by further correcting on a subsequent timestep. A mapping that satisfies these application approximation requirements may be implemented using a ruleset of boundary-structured rules by limiting the merging of subregions to these approximation bounds, both on the data points and on the labels.

Per-attribute Approximation Bound. In one embodiment, there is an approximation bound per attribute. This recognizes that the relevant level of error and application-level sensitivity is often specific to the source of this attribute data and the nature or semantics of the attribute. Therefore, a data point DP0 is near to a data point DP1 as referred to herein, if the differences between values for each attribute A in these two data points is less than the corresponding approximation bound for A. The approximation bound may be selected based on knowledge of the application domain, in particular the dynamics of the system over time. It may also be computed based on the values of other attribute values.

This approach contrasts with traditionally computing Euclidean distance based on the computed difference across the dimensions. For example, if one attribute is color and another is temperature, there is no clear basis or semantics for a distance metric computed in terms of both of these attributes.

There is also an approximation bound on label values. If an input record maps to an existing subregion, that is, its corresponding subregion intersects with this existing subregion, and its label differs from the label of that subregion by less than the label approximation bound, the conflict may be resolved by considering this input record to have the label of the existing subregion. For example, if the input label is "moderately heavy" and the existing label is "slightly heavy" and these labels are considered close enough, the input label may be considered as though specified as "slightly heavy" instead if it maps to a subregion labelled "slightly heavy", especially if it is an isolated point within a subregion that is labelled "slightly heavy". If a label differs by more than the approximation bound from that of a subregion to which its input record data point maps, it is considered a conflict and requires conflict resolution.

Figure 6A:
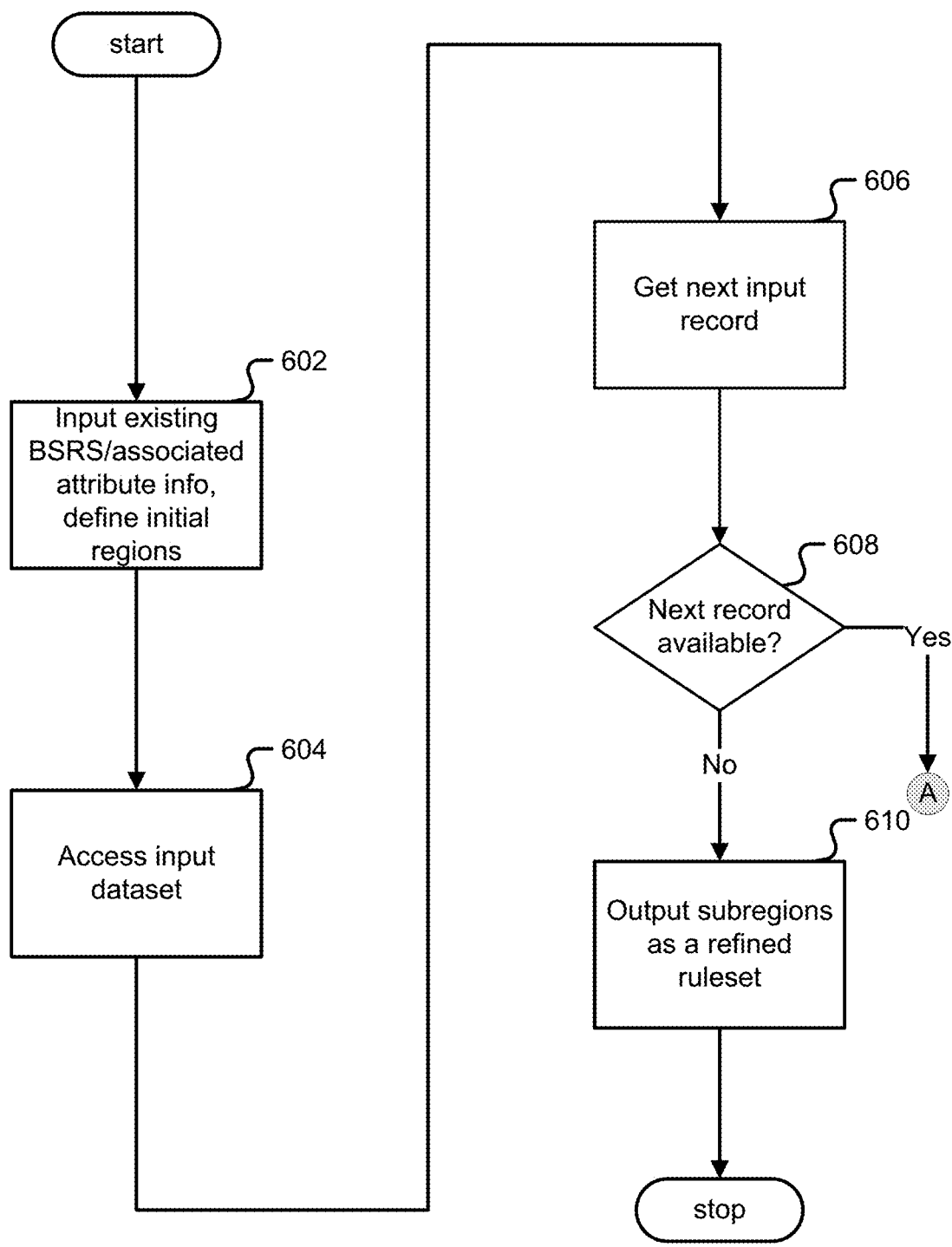
FIGS. 6A and 6B are a flow diagram illustrating an embodiment of a process for basic automatic approximating refinement of a ruleset from a labelled data set.
Figure 6B:
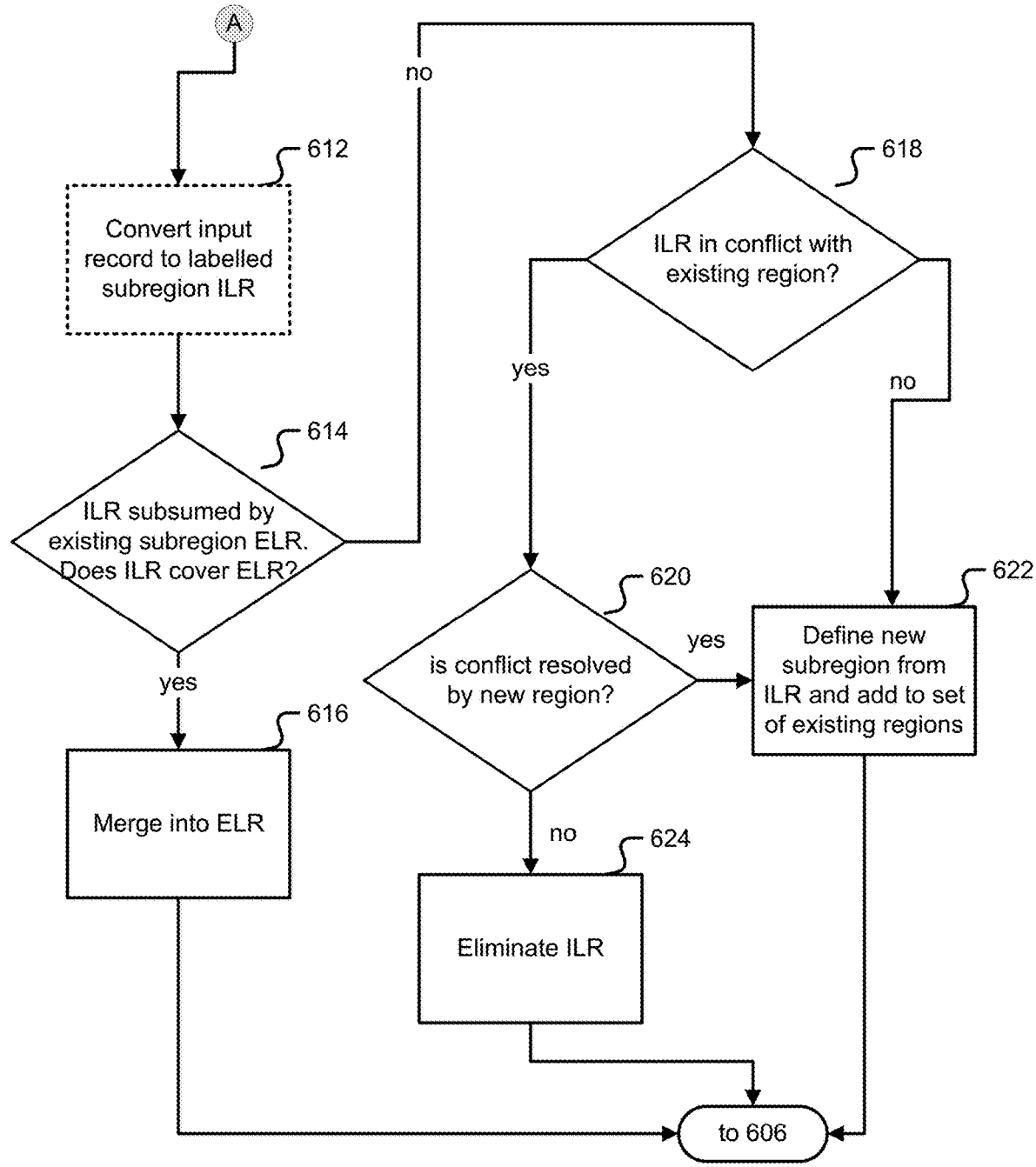

Basic Automatic Generation Method. FIGS. 6A and 6B are a flow diagram illustrating an embodiment of a process for basic automatic approximating refinement of a ruleset from a labelled data set. In one embodiment, the process of FIGS. 6A and 6B is processed by the system of FIG. 1.

In step (602), an existing boundary-structured ruleset, BSRS, and associated attribute information, such as the minimum and maximum values for each attribute and the attribute approximation bounds is input. An internal representation corresponding to labelled subregions is generated, as depicted simply in FIG. 4 and FIG. 5. In step (604), the set of input records is accessed. In step (606), a "next input record" is attempted to be read, which initially is the first input record, setting up a loop over all input records between steps (608) and steps (612) through (622).

Next, in step (608) a check is made if there is a valid next input record. In the event there is not, in step (610) the set of labelled subregions is output as the refined version of BSRS; otherwise, control is transferred to step (612). In an optional step (612), an input labelled subregion (ILR) is generated with the label of that record and position at the data point designated by the values in that input record, expanded by the approximation bound for each dimension. This labelled subregion is represented as, or may accurately be converted/translated to, a boundary-structured rule in the rule system. In an alternate embodiment, step (612) as shown in FIG. 6B represents the input ILR simply by the data point itself without expansion by the approximation bound for each dimension.

In step (614), the input ILR is "subsumed" by an existing labelled subregion (ELR). As referred to herein, a subregion A is subsumed by subregion B if: (1) subregion A is contained in subregion B or an expanded subregion B, expanded consistent with the approximation bounds on the dimensions/attributes and (2) the label on subregion A is within the label approximation bound of the label on subregion B.

In step (614), in the event that the ILR is covered by the ELR, then in step (616) the ILR is merged into the ELR; otherwise control is transferred to step (618). In step (618), in the event the ILR is in conflict with the ELR because of a significantly different label, then in step (620) the conflict is resolved; otherwise, control is transferred to step (622). In step (620) in the event the conflict is resolved by the new region, control is transferred to step (622); otherwise control is transferred to step (624). In step (622), a subregion is added to the set of existing subregions with this subregion corresponding to the ILR and its labelling corresponding to the ILR labelling. In step (624), the ILR is ignored and/or eliminated.

Reviewing the process of FIGS. 6A and 6B, a given input data point and its associated region ILR:
1. is subsumed by an existing labelled subregion ELR if it has the same or approximately same label to the ELR and it is contained in the ELR, or the ELR may be expanded to contain it without exceeding the specified approximation bound;
2. conflicts if it overlaps with the existing labelled subregion ELR with a different label, so a conflict resolution method is invoked to resolve it; or
3. is added as a subregion to the collection of existing labelled subregions if it was not merged and not eliminated as a conflict.

Therefore, informally, a new input record expands an existing subregion if it is the same label and close to it, and otherwise creates a new labelled subregion unless it is eliminated by conflict resolution. As referred to herein, eliminate can include recording as an erroneous or suspect input value or simply discarding that input.

Returning to FIG. 5, the depiction illustrates expanded labelled subregions that may be generated by the process of FIGS. 6A and 6B using a hyperrectangle BSR system:

ELR0 (502) is an ELR with a "vertical shading" label, generated by merging three adjacent ILRs;

ELR1 (504) is also an ELR with a "vertical shading" label, generated by a different two adjacent ILRs. However, it is not merged with ELR0 even though it is adjacent to ELR0 because the result would not be a hyperrectangle;

ELR2 (506) is another ELR generated by two adjacent ILRs with a "diagonal shading" label, but has a different label so is not merged with ELR1;

ELR3 (508) is a separate ELR with the same "vertical shading" label as ELR0 and ELR1, generated by two adjacent ILRs, but is not merged with ELR0 and ELR1 because it is not adjacent.

In one embodiment, the conflict resolution method records when invoked that the input labelled subregion is a conflict and possibly flags it to not be considered further, that is, eliminates it and/or ignores it. One form of conflict resolution is curtailing the subregion with which it conflicts, if the result is not excessively inconsistent with the set of input records.

In one embodiment, the processing merges any two existing labelled subregions with the same label that are near and/or close enough and may be represented in the merged result as a BSR and whose merged subregion does not create a new conflict, that is, an overlap with another labelled subregion with a different label. For example, if ELR1 (504) in FIG. 5 is expanded at a later point by another data point (not shown in FIG. 5) that adds a subregion above such that ELR0 (502) and ELR1 (504) form a hyperrectangle and thus may be merged and represented as a single labelled hyperrectangle, the process represented by FIGS. 6A and 6B discovers this and merges these two subregions, thereby producing a merging of the corresponding rules. This check for mergeability of subregions and the merging action may take place during the inputting of the IRLs (602), (604) or after this processing has been completed (610), as a post-processing step.

In one embodiment, traditional collision detection algorithms are used to detect overlap between a new input record subregion and existing subregions. For instance, each subregion may have a bounding geometry that includes all data points that are within the approximation bound of this subregion. Therefore, a traditional collision detection algorithm may be used with these bounding geometries to detect if the data point specified by an input record is within or close enough to an existing subregion.

Figure 7:
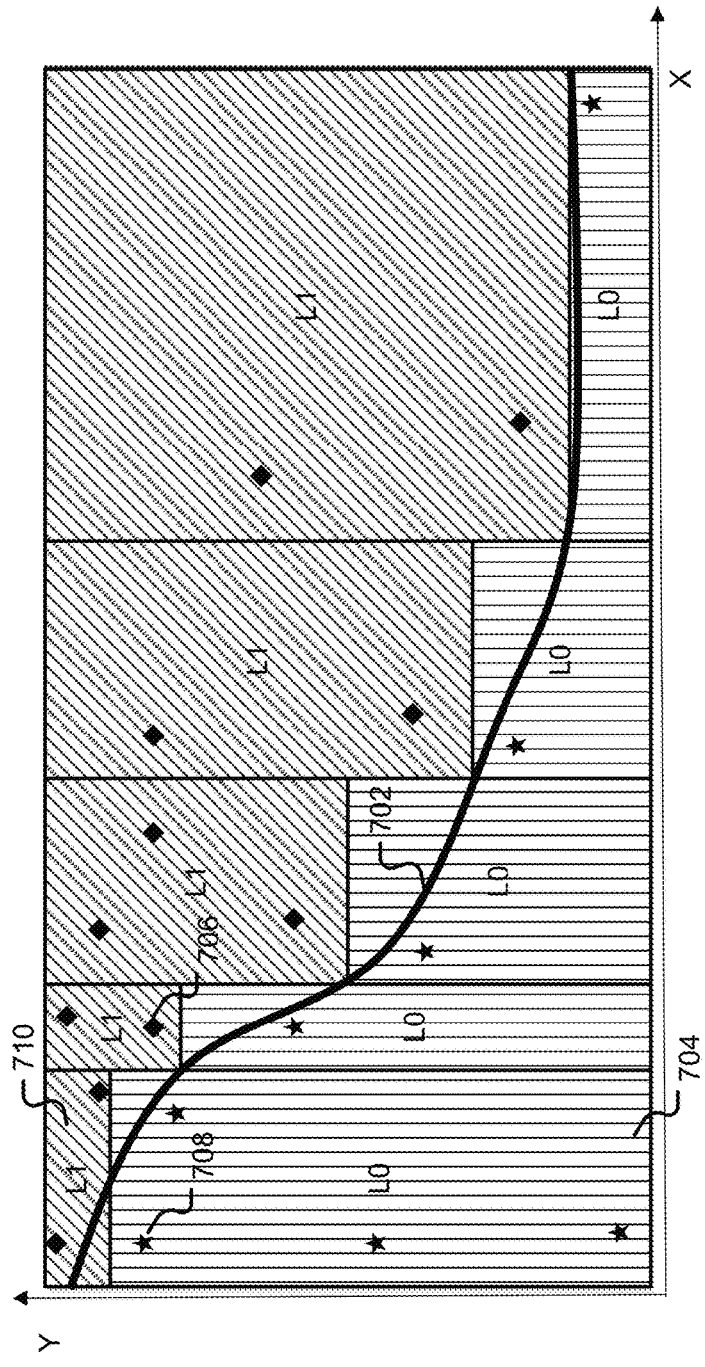
FIG. 7 is a diagram illustrating a completed basic automatic generation and/or approximating refinement of a ruleset from a labelled data set.

FIG. 7 is a diagram illustrating a completed basic automatic generation and/or approximating refinement of a ruleset from a labelled data set. As shown in the example of FIG. 7, the two-dimensional X-Y axis, where K=2, is similar to that depicted in FIG. 2, which shows hyperrectangle-specified subregions approximating a continuous curve (702) representing an underlying natural/physical/engineered system. In one embodiment, FIG. 7 is the completed result of the process of FIGS. 6A and 6B.

Input labelled points and/or input records are depicted in FIG. 7 by: stars for those associated with label L0; and diamonds for those associated with label L1. Labelled subregions are depicted in FIG. 7 by; "vertical shading" for those associated with label L0; and "diagonal shading" for those associated with label L1.

Based on the local statistical smoothness assumption and approximation bounds, the completed result of FIG. 7 is far fewer subregions, and thus relatively few rules, than the number of input records. For example, as shown in FIG. 7, there are eight stars but only five L0 labelled regions, and there are 11 diamonds but only five L1 labelled regions. The completed result of FIG. 7 also provides more complete coverage than the input records alone.

In FIG. 7, the approximation bounds on the Y values limits the width of each hyperrectangle by requiring the Y value on the top boundary not differ from that of any data point in a hyperrectangle by more than this approximation bound. For instance, the leftmost L0 rectangle (704) is limited in width because the L1 data point (706) to the right of it may otherwise force the top of the L0 rectangle (704) further down than the Y approximation bound to the top leftmost L0 data point (708) may allow.

Note that, without the approximation bounds and without translating individual data points to subregions, there is no basis for having one rule represent multiple input data points. Therefore, the generated ruleset may have as many rules as the number of unique records in the set of input records and no generated rule may match input that is not a value combination present in this generating set of input records.

Restrictive Inheritance and Evolution. In one embodiment, a boundary-structured ruleset may be generated using restrictive inheritance, as disclosed in U.S. patent application Ser. No. 18/243,631 (Publication US/20240086724A1) entitled RESTRICTED INHERITANCE-BASED RULE CONFLICT RESOLUTION with filing date Sep. 7, 2023 which is incorporated herein by reference for all purposes. In particular the generation of a boundary-structured ruleset may be invoked with an input ruleset that specifies a base ruleset as well as an input data set/set of input records and feature information. Thus, the refined ruleset is produced as a derived ruleset of the base ruleset and a refinement of the input ruleset.

The initial subregions are initialized in part from the rules in base ruleset as well as the input ruleset, with the subregions from the base rules indicated as base subregions. This base ruleset may be generated manually or by automatic generation from a base set of input records or a combination of these two techniques. For instance, the base ruleset could be auto-generated by the methods of the disclosed but have itself a base ruleset that is manually generated. As in U.S. patent application Ser. No. 18/243,631, the set of input records may include extra features or attributes beyond those in the base ruleset. In this case, these extra features or attributes are treated as "don't care" in the rules in the ruleset, so these extra features do not prevent recognizing an overlap between a derived rule and a base rule.

The generation then proceeds the same as the previous method except, when a new candidate BSR subregion overlaps with a base subregion rule and conflicts, it is indicated as a derived subregion that is overriding the base rule in the subregion of overlap rather than truly conflicting. An input record that is subsumed by a base rule is treated the same as previously, that is, such as causing the processing to go onto the next input record without further action for this input. The method still checks for conflict between the input record subregion and other subregions associated with the top-level input ruleset.

After the resulting ruleset is generated, the rule system then evaluates this resulting output ruleset as disclosed in U.S. patent application Ser. No. 18/243,631. In particular, when input matches both a derived rule and a base rule, the consequent of the derived rule is used.

Automatic Generation Method Using Unconfirmed Subregions. In one embodiment, an unconfirmed subregion is maintained per subregion. Thus, there is a collection of expanded labelled subregion pairs (ELRP) where each ELRP comprises a confirmed subregion and an enclosing unconfirmed subregion. The confirmed subregion is determined the same as the previous method. The unconfirmed subregion is the maximum extension of this subregion, within the constraints of the boundary representation, that does not conflict with the confirmed subregion of another ELR.

In one embodiment, the unconfirmed subregions are maintained by adapting step (622) as shown in the process of FIGS. 6A and 6B to create an unconfirmed subregion corresponding to the new/confirmed subregion. This entails starting with a copy of this new/confirmed subregion and expanding it until any further expansion may overlap with other confirmed subregion or subregions. Also, it reduces any other unconfirmed subregion so this other unconfirmed subregion does not overlap with this new confirmed subregion.

Step (616) in the process of FIGS. 6A and 6B also is adapted to reduce any other unconfirmed subregion so this other unconfirmed subregion does not overlap with the expanded confirmed subregion. As well, step (610) is adapted to use the unconfirmed subregions to output rules. A rule corresponding to an unconfirmed subregion is a rule in which the antecedent is not significantly contradicted by data points in the set of input records. It is thus not restricted to being within the specified approximation bound. Such a rule may be used, possibly with lower confidence, when the output ruleset does not contain a rule generated from a confirmed subregion that includes the current input value combination. Thus, unconfirmed subregions allow the output ruleset to achieve coverage at the expense of not maintaining the approximation bound when the set of input records is not sufficiently "dense", that is, does not contain enough data points to achieve coverage with the specified approximation bounds.

Confidence Metric. In one embodiment, for each confirmed/unconfirmed subregion pair, a confidence or accuracy metric or level may be computed from the characteristics of the confirmed and unconfirmed subregion pair, such as the maximum distance between the confirmed subregion and the boundary of the unconfirmed subregion, volume of the unconfirmed subregion versus the confirmed subregion, the number of data points and other potential metrics on the pair or even its adjacent pairs. An application may use that as an indication of whether the approximation using unconfirmed subregions is sufficiently accurate, reporting what subregions are not adequately covered in the data set. For instance, each generated rule may have a confidence level indicated as a function of this measure. If the confidence is too low, the ruleset generation may be re-run with an augmented data set, particularly augmented with data in the insufficiently covered area. Alternatively, additional rules may be provided for these subregions by manually generating them from application knowledge.

In one embodiment with a hyperrectangle BSR representation, the new unconfirmed subregion may initially be made the same as the enclosing unconfirmed subregion. Then, one attribute is selected to partition between the ranges for that attribute for the new and the enclosing subregions. This recognizes that if a subregion does not overlap in one dimension with another, it does not overlap at all.

Illustration. FIGS. 8-11 are diagrams illustrating a basic automatic generation and/or approximating refinement of a ruleset from a labelled data set using unconfirmed subregions. As shown in the examples of FIG. 8-11, the two-dimensional X-Y axis, where K=2, is similar to that depicted in FIG. 2, which shows hyperrectangle-specified subregions approximating a continuous curve (702) representing an underlying natural/physical/engineered system.

Figure 8:
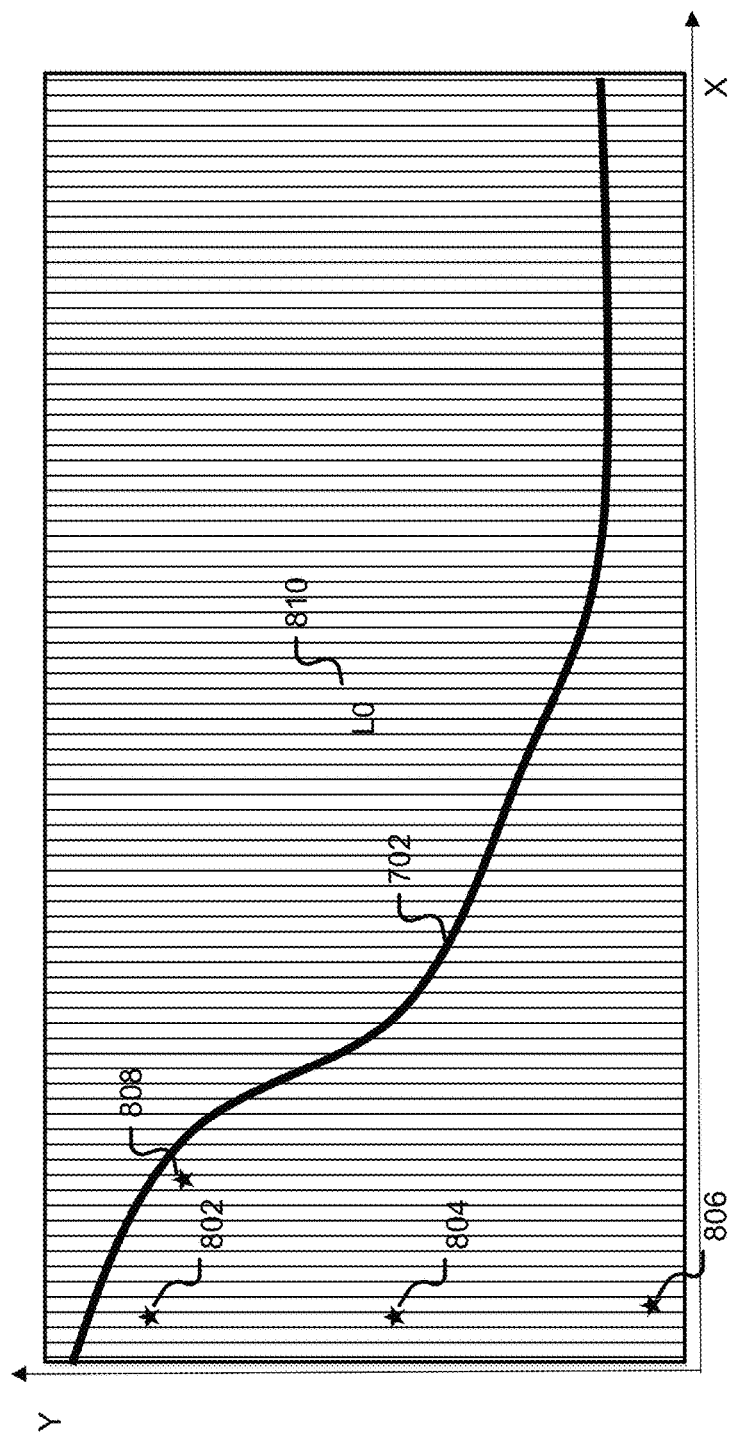
FIGS. 8-11 are diagrams illustrating a basic automatic generation and/or approximating refinement of a ruleset from a labelled data set using unconfirmed subregions.

In FIG. 8, initially received data points labelled L0 are represented by stars (802), (804), (806), and (808). Therefore, the confirmed subregion is the column subregion on the left and the entire rest of the input space is the unconfirmed subregion for L0 or with "vertical shading" (810).

Figure 9:
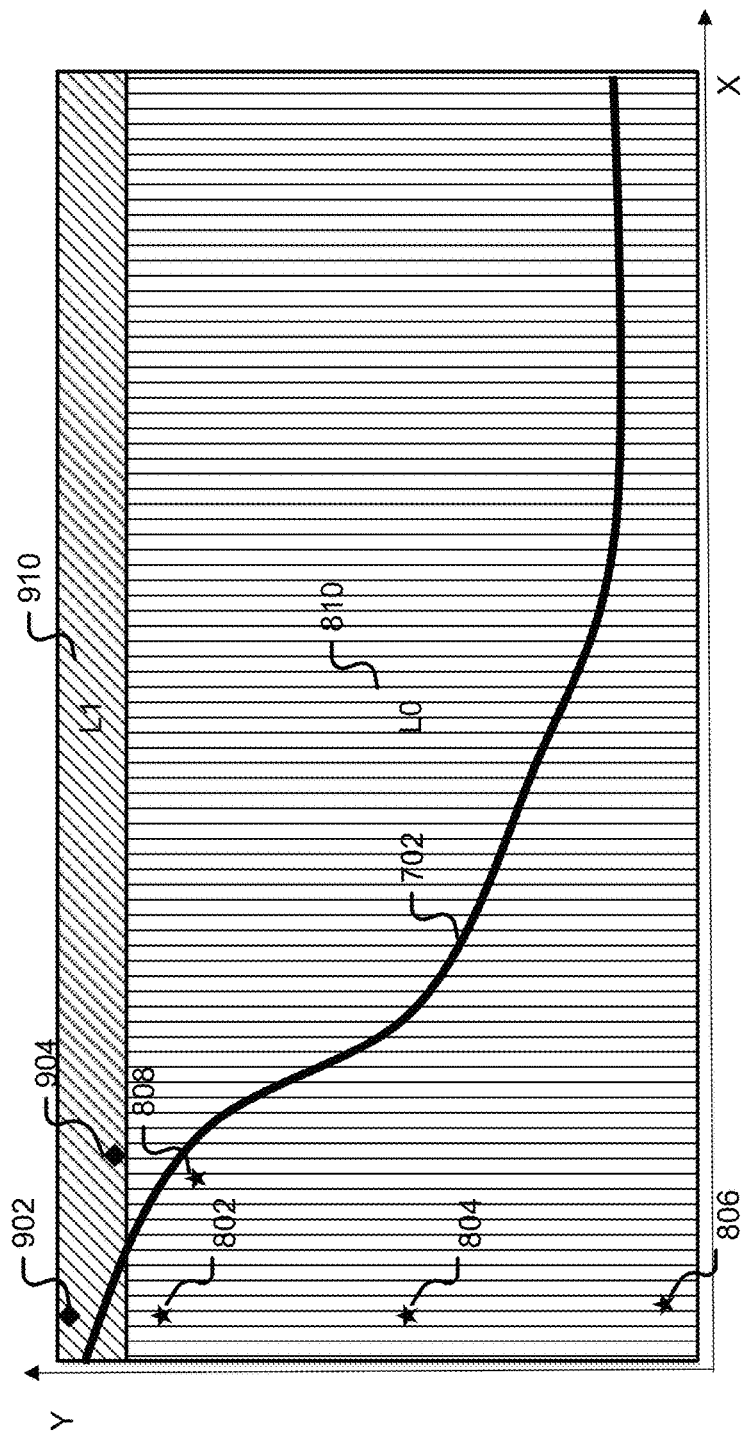

In FIG. 9, an L1 data point (902) is received in the top-left corner of the input space. To integrate this data point (902), the L1 subregion (910) is created as depicted in FIG. 9. Its unconfirmed subregion (910) is reduced on the Y dimension so that it does not overlap with the hyperrectangle corresponding to the confirmed L0 subregion (810), defined by the L0 data points just below it in the Y dimension. Furthermore, the unconfirmed L0 subregion (810) is reduced in the Y dimension so that it does not overlap with the L1 confirmed subregion (910).

Figure 10:
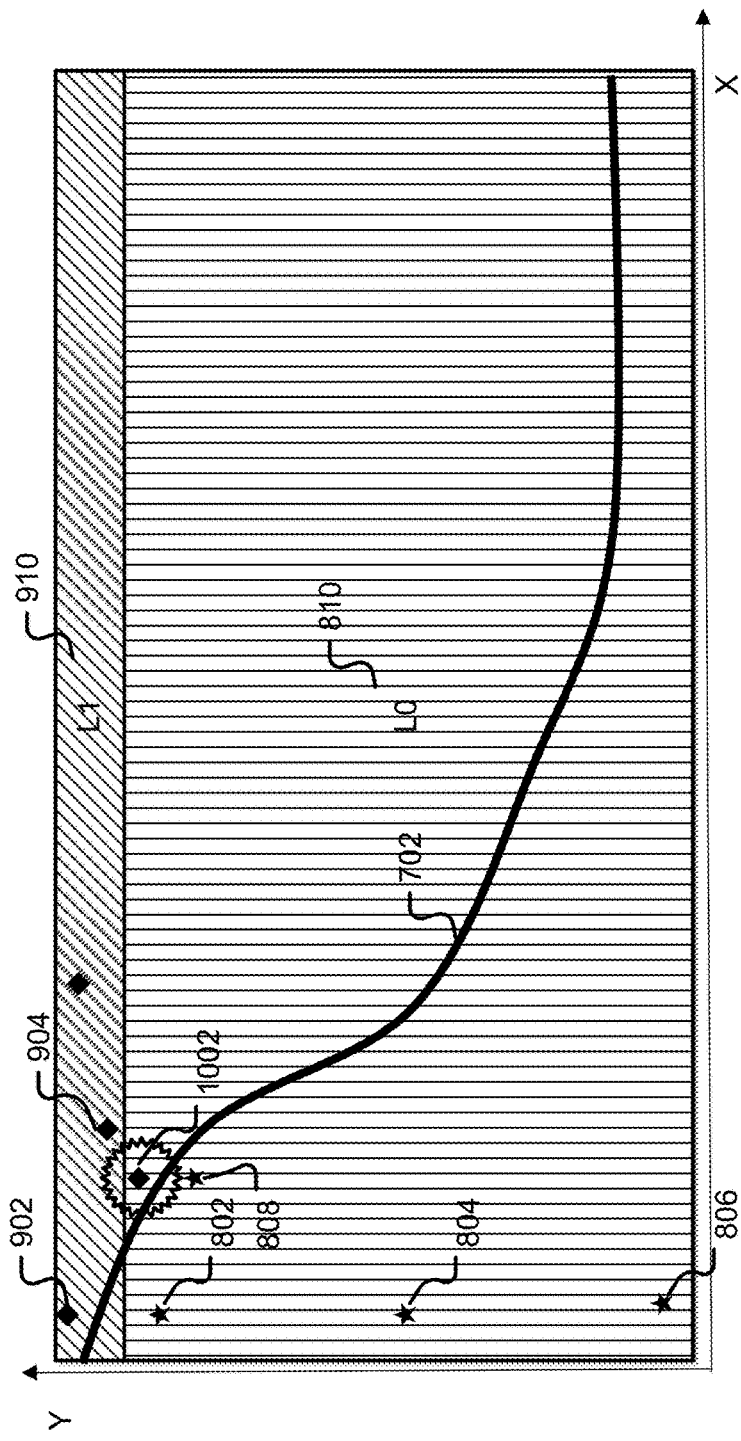

In FIG. 10, an L1 data point (1002) is received in an L0 subregion, for example after receiving additional subsumed data points. It is relatively close to the confirmed subregion of L0 (810)/to another L0 data point (808) as depicted in FIG. 10. Therefore, the conflict resolution may decide to ignore this data point rather than creating a new subregion, exploiting the fact that this mapping is an approximation. Therefore, the containing L0 subregion (810) remains unchanged.

Figure 11:
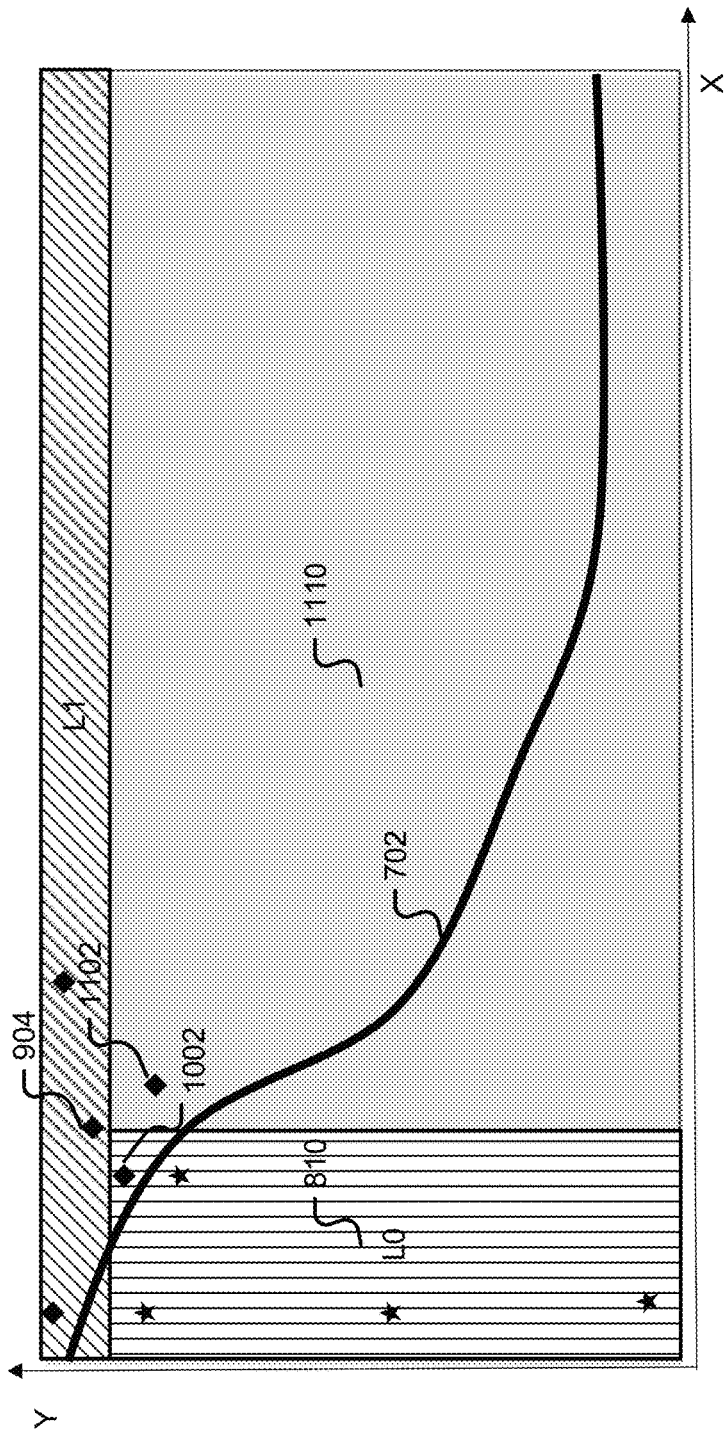

In FIG. 11, receiving the leftmost L1 data point (1102) causes a new subregion pair to be created for the new unconfirmed L1 subregion (1110) shown in FIG. 11. The unconfirmed L0 subregion (810) is reduced on the X dimension so that it does not intersect with this new unconfirmed L1 subregion (1110).

Generating with Preprocessing to Revise Attribute Values. In one embodiment, the set of input records is preprocessed to improve the automatic rule generation of the process depicted in FIGS. 6A and 6B. For example, an attribute may indicate a categorization or enumeration of temperature ranges yet have its numeric values are not consistent with semantic proximity. For example, if the values of the ranges, neutral, warm, cool, hot, cold, very hot and very cold are assigned sequentially in the order of those names, clearly the value of cool is not between cold and neutral, similarly for several of the other values. The preprocessing may effectively redo this numeric assignment to reflect the semantic ordering, so that each named range has a value that is higher than the temperature range just before it and lower than the temperature range after it. That is, the value of cool is between cold and neutral, similarly for several of the other values.

As another form of preprocessing, the values may be changed to amplify their dynamic range or adjust for different levels of sensitivity across the range of values. For example, if the temperature sensor has error bounds that are 0.5 degrees for temperatures between 32 and 100 F, but 1.0 degrees for temperature outside of that range, the temperature values between 32 and 100 F may be increased by a factor of two and those outside may be additive to the resulting min and max values, that is, 64 to 200. Then, a common error bound may be used for the temperature attribute, regardless of value. The same preprocessing is then applied when the resulting rule system deployed, ensuring the result is consistent, for example that 100 F actual temperature is provided to the rule system as the value 200.

As another example, the preprocessing may estimate the value for an attribute in an input record when that value is missing or unknown.

An unlabelled data set may be treated as a labelled data set by preprocessing to compute a label from one or more attributes selected from the input record and then possibly excluding one or more of these selected attributes from consideration in the rule generation. For example, if one of the attributes is the rate of temperature change in a chemical process, a set of ranges of these rates of change may be identified as the label. Then, the rule generation may generate rules that essentially capture the association between the other input attributes and this rate of temperature change. Other forms of preprocessing transformation may be applied to the set of input records to improve the behavior of the overall system.

Preprocessing to Provide Time Sequence Records. In one embodiment, input records have some indication of time so that a subset of input records that correspond to a sequence of values in time are preprocessed into time-sequence input records. Each such time-sequence input record indicates relevant values for a multiplicity of times, with said times and values determined in part from the original input records. For example, suppose the input record indicates the temperature and level of furnace heat at 5 second intervals. The preprocessing may produce a time-sequence record for a 60 second interval containing the 12 2-tuples corresponding values of the temperature and furnace heat at each of the 5-second intervals for that record. Then, the generated rules may have antecedents that are triggered by temporal sequences of states, not just input value combinations at a particular time.

The selection of the start time for time-sequenced record may be selected by a change in some input attributes. Continuing the example above to illustrate, a new time sequence record may be started when the level of gas to the furnace is changed significantly. Then, the time sequence record captures the behavior of the furnace over time based on the change in that input.

Generating from Pre-Clustered Input Records. In one embodiment, the input records are preprocessed to organize them into "clusters" but excluding the label as part of the clustering determination. That is, input records whose attributes values constitute data points that are close to each other in K-dimensional space, independent of their labels, are placed in the same cluster as referred to herein. For example, the clustering may be based on a subset of the input attributes. The Minimum Bounding Rectangle (MBR) algorithm or similar algorithms may be used to determine boundaries around each cluster. As referred to herein, organize is meant that the preprocessing effectively generates a new set of input records in which all the records in a cluster are processed together, separate from other records in other clusters.

After this rearrangement of the set of input records into clusters, the above method of FIGS. 6A and 6B is applied to the resulting set of clusters of input records, input processing all the records in a cluster according to the earlier method, generating subregions per cluster. The processing then checks for overlap and potential merger with subregions across clusters. This final step may be performed after completing the processing of each cluster or as the processing of each cluster takes place, such as after completing the input processing of each cluster.

In one embodiment, a cluster is predefined by a subregion of the input space. For example, the input space may be divided into N regions based on a bounding geometry for each such region. Then, an input record is added to a cluster if its data point lies within the bounding geometry of that region. These regions then act as essentially buckets in the sense used in traditional bucket sorting methods and as referred to herein. Each such region is referred to as a bucket region. For instance, in one embodiment using range-structured rules, a bucket region may be defined by an axis-aligned hyperrectangle. In effect, a bucket is a cluster that is defined by its boundary in K-dimensional space, independent of input data points, as opposed to being defined by the proximity of input data points.

Generating from Partially-sorted Input Records. In one embodiment, the set of input records is partially sorted in advance of the process depicted in FIGS. 6A and 6B being executed. In one embodiment, the set of input records is partially sorted by distributing each input record into a cluster in a sequence of clusters where the sequence of clusters is ordered by some ordering relationship. For instance, if a bucket corresponds to a region in the K-dimension space, a "bucket region" as above, a bucket $B_j$ is the successor to bucket $B_i$ if $B_j$ is the next higher bucket region, treating a bucket region as higher if contains higher data points, treating a data point as lexicographically ordered by the value of their attributes. For example, a bucket corresponding in part to the temperature being in the range corresponding to cold is sorted to appear before the bucket corresponding in part to the temperature being cool, which is before warm, which is before hot.

The generation then proceeds by processing one bucket at a time, generating subregions in the current bucket region using a similar process depicted in FIGS. 6A and 6B as input records are read and converted to data points in this input space. The processing proceeds to the next bucket when the input records in the current bucket have been processed.

In one embodiment using pre-processed inputs into clusters and an ordering of cluster based on proximity, an active subregion is referred to herein as one where it is possible at this point in processing for a subsequently generated subregion to be close enough by the proximity measure to be merged with this subregion. Stated the other way around, a subregion is inactive once the input processing is processing a cluster such that no input record data point in this cluster or a subsequent one may be close enough by the proximity measure to be mergeable with this subregion. Informally, the subregions in a cluster only on one far side of the input space may not be merged with subregions generated on the other side of input space.

Thus, a subregion is not considered for further merging once it is determined to be inactive, thereby reducing the overhead of checking for subsuming/merging. That is, the subsume/merge operation into subregions of a bucket checks whether any of subregions are no longer active, that is inactive, and if so, attempts to subsume/merge each such subregion into the next containing bucket. For instance, if any input record after the current one is too far away from a bucket region B for it to be possible for it to contribute to a subregion that may be merged with subregions in B, then B is determined to be inactive at this level.

In one embodiment, there are multiple active clusters based on the proximity measure. A subregion that is deemed not active in its current cluster is "promoted" to the next cluster. In one embodiment, there is a hierarchy of clusters, such that an inactive cluster at one level may be merged into a next level cluster, either causing the creation of a next level subregion or merging with a subregion in this next level cluster.

Figure 12A:
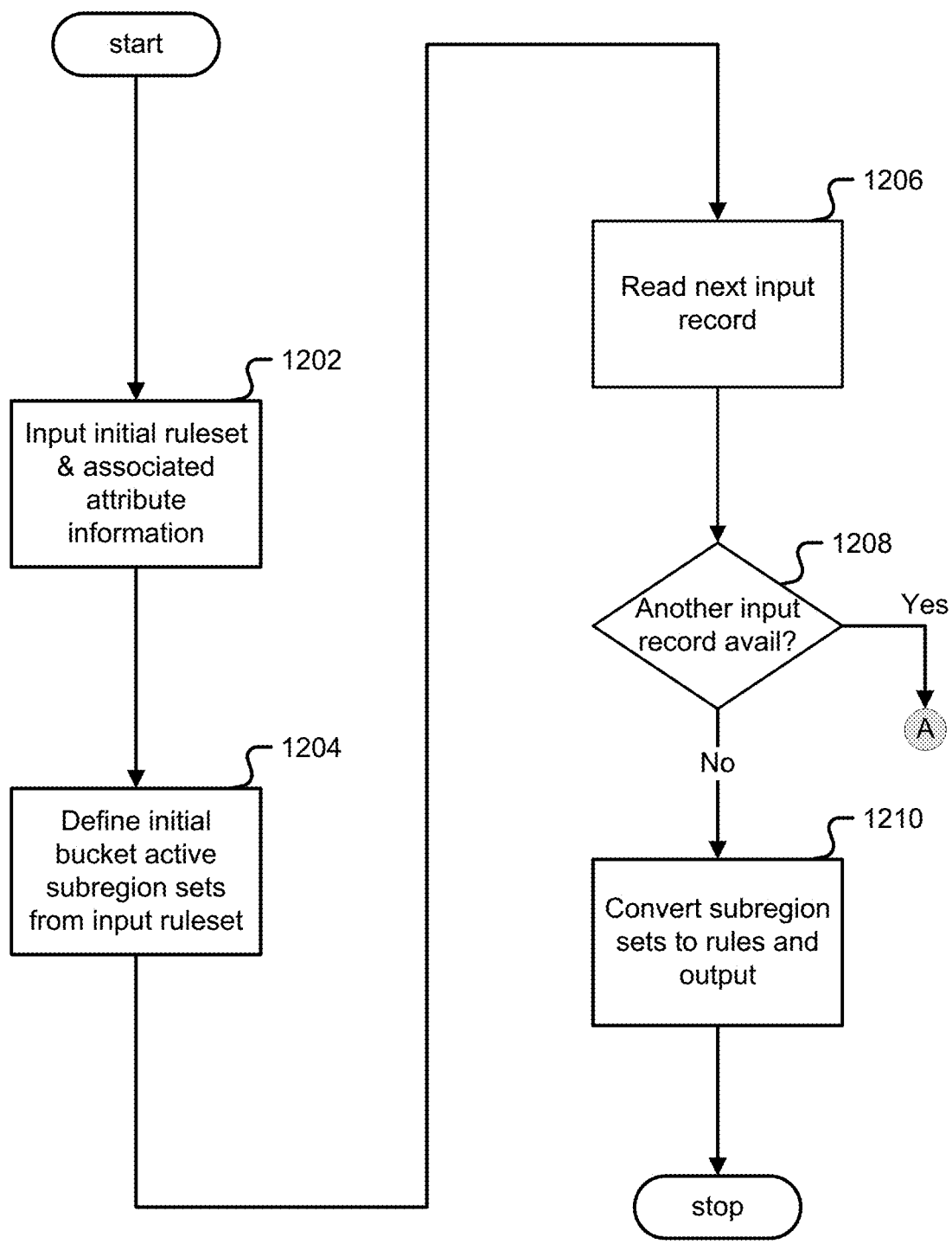
FIGS. 12A and 12B are a flow diagram illustrating an embodiment of a process for bucketed automatic approximating refinement of a ruleset from a labelled data set.
Figure 12B:
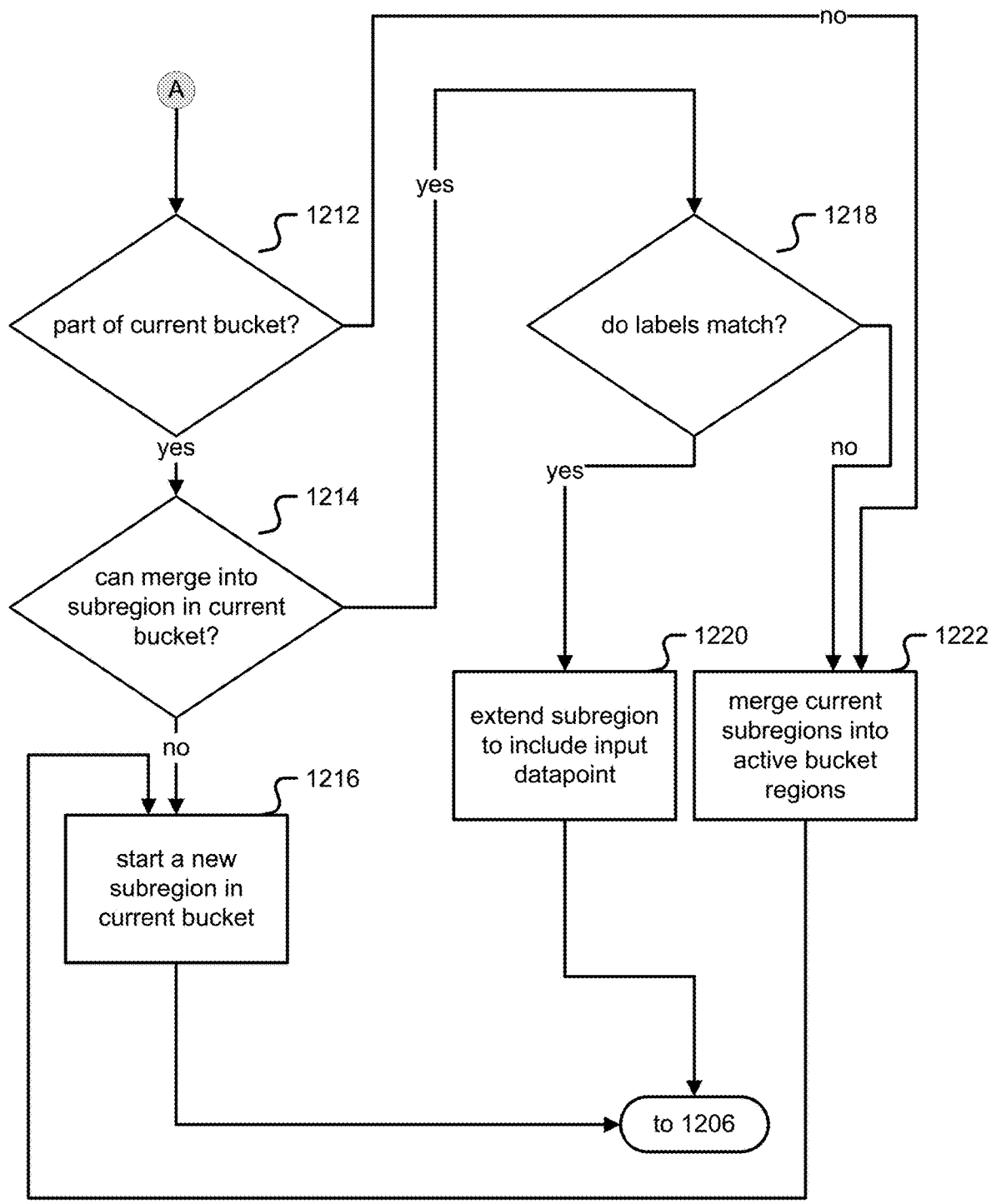

Bucketed Automatic Generation Method. FIGS. 12A and 12B are a flow diagram illustrating an embodiment of a process for bucketed automatic approximating refinement of a ruleset from a labelled data set. In one embodiment, the process of FIGS. 12A and 12B is processed by the system of FIG. 1. In one embodiment, the process of FIGS. 12A and 12B is an enhanced version of the process of FIGS. 6A and 6B.

In step (1202), an initial ruleset and associated attribute information is input, including the number of attributes, K, the number of dimensions. The initial ruleset is either a boundary-structured ruleset or may be converted/translated to labelled subregions.

In step (1204), the collection of active buckets is initialized from the input ruleset, including a null current bucket region and its associated set of subregions. Rules in the input ruleset are mapped onto these buckets. For instance, there may be a superbucket corresponding to the entire input space and a corresponding subregion set that contains subregions corresponding to these rules. In step (1206), the next input record is read. In step (1208), if no more input records are available, then in step (1210) which optionally performs any additional merging, converts the subregion sets to rules, and then outputs these rules as the resulting output ruleset; otherwise control is transferred to step (1212).

In step (1212), in the event the available input record is part of the current bucket region control is transferred to step (1214); otherwise control is transferred to step (1222). In step (1212), determining whether an input record is in the current bucket region comprises determining if the data point specified by the input record is in the current bucket region. It is assumed there is a way to determine the bucket region for a given input record. As a simple example, the input space may be partitioned into fixed-width hyperrectangles, effectively a K-dimensional grid, so the bucket region for the given input is the one for the grid cell to which the data point associated with this input maps.

In step (1214), in the event the input record as a data point may be merged into an existing subregion in this current bucket, that is, it is within the approximation bound to this subregion and the existing subregion may be expanded to include this data point without conflicting with other subregions, control is transferred to step (1218); otherwise control is transferred to step (1216).

In step (1218), in the event the input record has the same or similar label as the existing subregion identified in step (1214), control is transferred to step (1220); otherwise control is transferred to step (1222). In step (1220), the subregion of the input record is expanded to subsume this input data point.

In step (1216), a new current bucket region is started with a subregion corresponding to the input record/new input. In step (1222), any subregions of the current bucket are subsumed/merged into the active bucket subregion and/or collection of active bucket subregions.

In one embodiment, not shown in FIGS. 12A and 12B, steps (1214) and (1218) are executed in the opposite different order, that is step (1218) is executed before step (1214). More important is that all three conditions of steps (1212), (1214), and (1218) be true in order to execute step (1220). In one embodiment, one or more buckets are processed in parallel rather than strictly sequentially. In one embodiment, each bucket region is a hyperrectangle. Therefore, multiple bucket regions are merged only if the result is a hyperrectangle or a set of hyperrectangles.

In one embodiment, the width of a hyperrectangle in the dimension corresponding to attribute A is restricted to being approximately half of the approximation bound for attribute A. For example, if the approximation bound for temperature is 10 degrees, there is a bucket for 0, 5, 10, 15, 20, and so on. Thus, each bucket straddles these values, that is, the bucket with value V handles the range [V−bucketDelta, V+bucketDelta) for A, where bucketDelta is one quarter of the approximation bound for attribute A. Thus, a temperature of 7.5 may go into the 10 bucket whereas a temperature of 17.499 may go into the 15 bucket. Therefore, values in adjacent buckets are at most the approximation bound apart and values in buckets that are not adjacent in A have values that are too far apart to allow merging.

Generating from Pre-sorted Input Records. In one embodiment, as a special case of partial pre-sorting, the input records may be fully sorted based on per-attribute sorting. For example, input records with a first dimension value X1 occur before input records with a first dimension value X2, if X1 is less than X2. Similarly, this may be expanded for the second dimension and so on. This may be thought of as imposing a lexicographical ordering on the input processing. With this sorting, the last attribute in the ordering is effectively the "least significant portion" by analogy to normal positional number representation, wherein here, "least significant" is specified only in terms for the ordering; the second-last is the second least significant portion, and so on.

Thus, the initial buckets correspond to each combination of values of attributes excluding the last attribute. Therefore, it is logically a K-dimensional "strip", that is, normally with single values for each of the first through $K-1^{st}$ dimensions.

Based on this sorting, the processing effectively iterates over all input records with the same values in the first to the second-last attribute, in order of increasing values in the last attribute before going to a new value for the second-last attribute, which is the next bucket. This last-attribute sequence is referred to herein as a strip because it is basically a 1-D subregion, that is a strip, embedded in the K-dimensional space. During the processing of a strip, it generates what is referred to herein as one or more substrips, each of which is a portion of a strip that has the same or similar label and data points within the approximation threshold of each other. These substrips correspond to the subregions of the current bucket in the previous method.

For pre-sorted generation, it is sufficient to check with each next input record whether this record is:
1. starting a new strip;
2. has a significantly different label from the previous record; or
3. is outside the approximation threshold with its last attribute value relative to the previous record.

If any of these three are true, the current substrip is terminated and added to a substrip collection. If it is starting a new strip, the substrip collection is processed and emptied by merging these substrips into either an existing 2-D subregion or else creating it as a new corresponding 2-D subregion and removing these substrips from the substrip collection. Then, a new substrip is started with this new input record. Alternatively, the substrips for a strip may be processed into the 2-D subregions as they are generated.

Here, a 2-D subregion refers to a subregion in which the first K−2 attributes are single values or the range equivalent. The 2nd last and last attribute values are typically non-singular ranges if this 2-D subregion results from the merger of two or more 1-D subregions, although they may be singular ranges. A subregion is considered active herein if the last input record has an attribute value for the dimension of this subregion that is within the approximation bound of the maximum value for this attribute in this subregion. Otherwise, it is considered inactive herein. That is, the proximity measure operates along the dimensions, from last dimension to first.

A substrip is merged into an existing 2-D subregion if it has approximately the same label, has approximately the same ranges for the first through to second last attributes/dimensions, the second last dimension/attribute value is within the approximation bound to this subregion, and the last attribute value of the substrip and the last attribute value of the subregion may be adjusted to be within the approximation bound for that attribute. The merger of 2-D subregions into 3-D subregions proceeds similarly, as does for 3-D into 4-D, and so on, up to and including the $K^{th}$ dimension. In those cases, the merger requires that the subregions are approximately the same on the previous dimensions and within the approximation threshold of the current dimension.

Figure 13A:
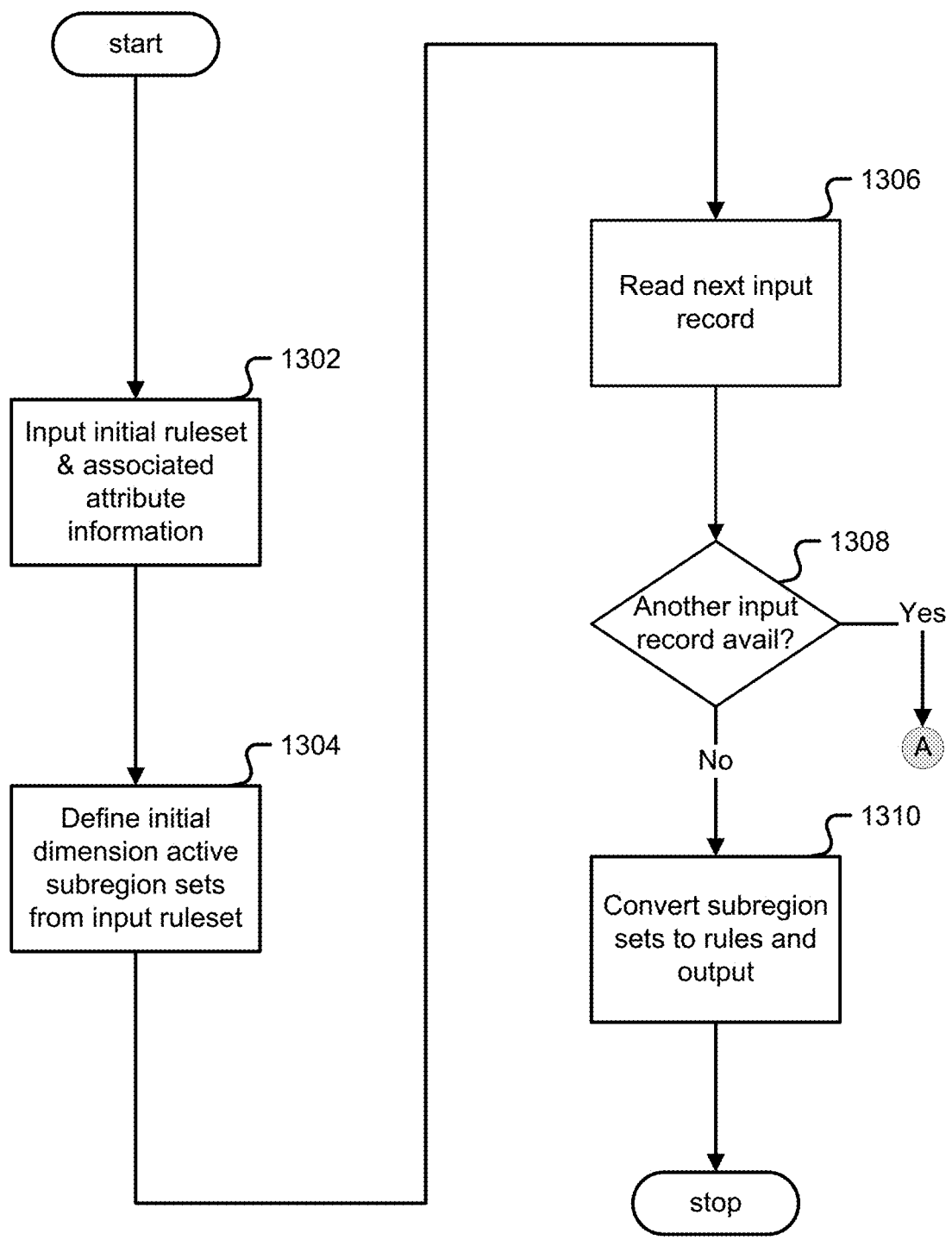
FIGS. 13A and 13B are a flow diagram illustrating an embodiment of a process for pre-sorted automatic approximating refinement of a ruleset from a labelled data set.
Figure 13B:
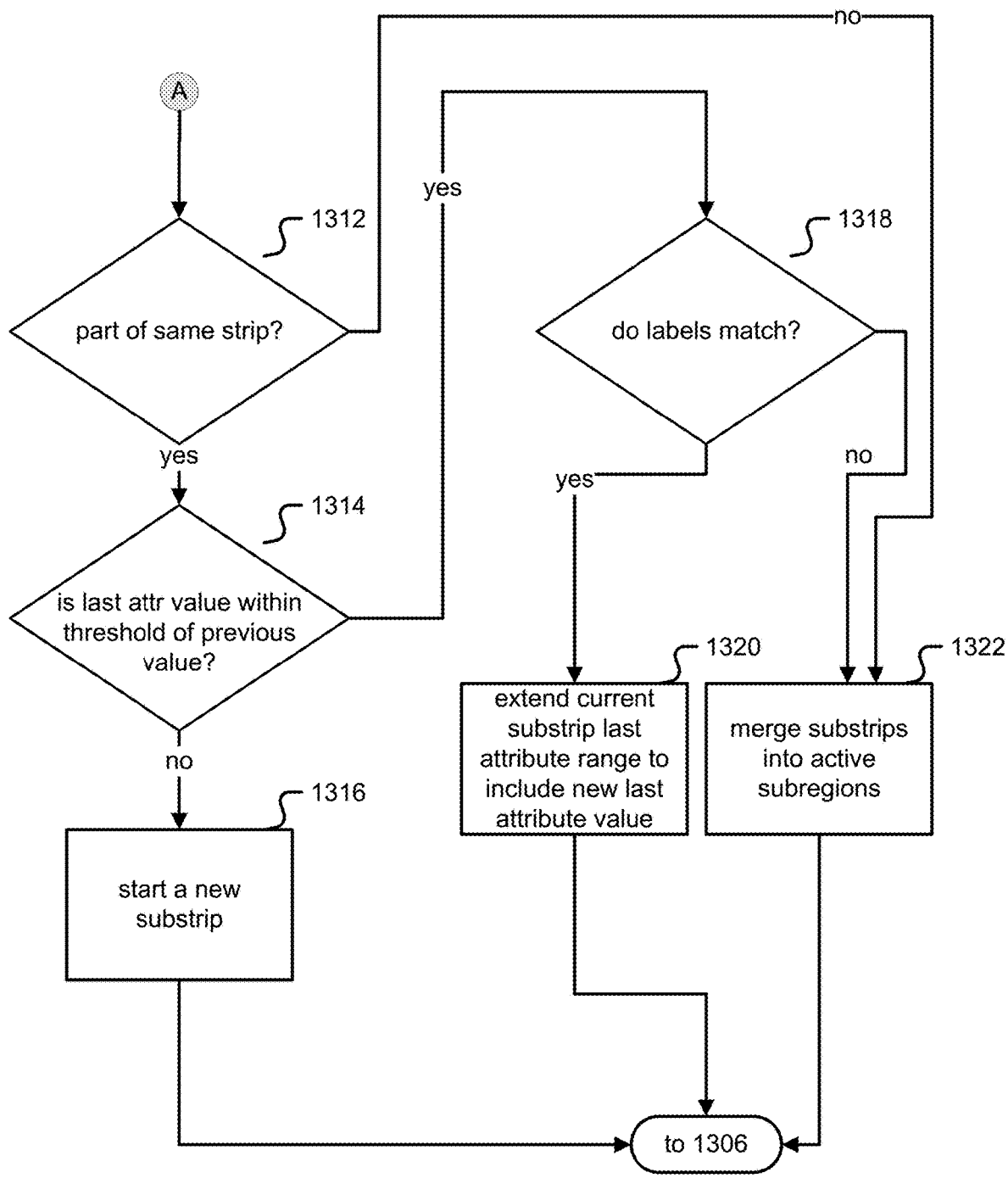

Pre-Sorted Automatic Generation Method. FIGS. 13A and 13B are a flow diagram illustrating an embodiment of a process for pre-sorted automatic approximating refinement of a ruleset from a labelled data set. In one embodiment, the process of FIGS. 13A and 13B is processed by the system of FIG. 1. In one embodiment, the process of FIGS. 13A and 13B is an enhanced version of the process of FIGS. 6A and 6B.

In step (1302), an initial ruleset and associated attribute information is input, including the number of attributes, K, the number of dimensions. The initial ruleset is either a boundary-structured ruleset or may be converted/translated to labelled subregions.

In step (1304), the collection of initial dimension active subregion sets is defined from the input ruleset. Rules in the input ruleset are mapped onto these and as described above, these correspond to each combination of values of attributes excluding the last attribute. Therefore, it is logically a K-dimensional "strip", that is, normally with single values for each of the first through $K-1^{st}$ dimensions.

In step (1306), the next input record is read. In step (1308), if no more input records are available, then in step (1310) the active subregion sets are converted to rules, and then outputs these rules as the resulting output ruleset; otherwise control is transferred to step (1312).

In step (1312), in the event the available input record is part of the same strip region control is transferred to step (1314); otherwise control is transferred to step (1322). In step (1312), determining whether an input record is part of the same strip comprises determining if the data point specified by the input record is in the same strip.

In step (1314), in the event the input record is outside the approximation threshold with its last attribute value relative to the previous record, control is transferred to step (1318); otherwise control is transferred to step (1316).

In step (1318), in the event the input record has the same or similar label as the existing subregion identified in step (1314), control is transferred to step (1320); otherwise control is transferred to step (1322). In step (1320), the current substrip last attribute range is expanded to include the new last attribute value, and control returns to step (1306).

In step (1316), a new substrip is started with a subregion corresponding to the input record/new input. As described above, the substrip collection is processed and emptied by merging these substrips into either an existing 2-D subregion or else creating it as a new corresponding 2-D subregion and removing these substrips from the substrip collection. Then, a new substrip is started with this new input record. Alternatively, the substrips for a strip can be processed into the 2-D subregions as they are generated.

In step (1322), any subregions of the current substrip are subsumed/merged into the active subregion and/or collection of active subregions. As described above, a substrip is merged into an existing 2-D subregion if it has approximately the same label, has approximately the same ranges for the first through to second last attributes/dimensions, the second last dimension/attribute value is within the approximation bound to this subregion and the last attribute value of the substrip and the last attribute value of the subregion may be adjusted to be within the approximation bound for that attribute.

In review of FIGS. 13A and 13B, the pre-sorted process is similar to the partially or bucket sorted method, but specialized in that:
1. the initial buckets each correspond to a "strip" and the input records are ordered within each strip;
2. the initial buckets or strips are ordered lexicographically by their associated attribute values, excluding the last attribute; and
3. $i^{th}$ dimension buckets/subregions are merged into $(i+1)^{st}$ dimension buckets, up to the K-th dimension, where the input space is K-dimensional.

The merge operation into active 2-D subregions checks whether any of these subregions are no longer active, that is, inactive, and if so, promotes each such subregion into the collection of 3-D active subregions (if K is greater than 2), either merging it into an existing 3-D subregion or else creating a new corresponding 3-D subregion. The promotion into each next dimension collection of active subregions further merges any subregions that are no longer active into the subsequent dimension of active subregions if it is not the final (that is, the first) dimension. For the final dimension, each K-dimensional subregion is optionally merged with others before being translated into rules and output into the result ruleset.

In one embodiment, preprocessing to cluster input records into buckets and the lexicographical ordering of buckets in part means that in the processing, an input record is either in the current bucket or the next bucket. This reduces the number of hyperregions to consider to determine if the input is subsumed. It also reduces the number of hyperregions to consider when merging hyperregions. For instance, in the case of two dimensions, regions are built up incrementally from the bottom left corner to the top right, for example. It also means that many unconfirmed regions extend to the input space limits on the portion of the multi-dimensional space containing the unprocessed buckets, making them simpler/easier to update as part of the processing.

The bucketing allows sets of close-together input records to be processed together, reducing the processing and space overhead, particularly for region merging.

Returning to FIGS. 6A and 6B, the depiction there illustrates the subregions generated for a 2-D hyperrectangle boundary-structured rule system using pre-sorting. The strips are generated along the Y dimension for each value of X. The 1-D substrips with the same label and matching dimensions are merged to form the leftmost L0 subregion (704), similarly for the leftmost L1 subregion (710). The L0 and L1 subregions that are illustrated are the result of generating expanded subregions for each input record, merging each into a substrip in the Y-dimension and then merging each substrip into a 2-D subregion along the X-dimension.

If there are base K-dimensional subregions, by the use of restrictive inheritance, the currently generated K-dimensional or derived subregions override base subregions so a derived subregion need not be merged with a base subregion. Instead, rule evaluation is used to select the most derived rule during rule evaluation.

In one embodiment, other sorting heuristics are applied, based on application knowledge and experimentation to reduce the overhead of approximation checking and the number of labelled subregions and thus, the number of BSRs. In addition, a preprocessing pass over the input data may provide statistics on the data set, such as the number of records with a given label, the size of these clusters and other information, besides rearranging the set of input records to optimize the generation process.

Generating With Reordered Attributes. In one embodiment, the attributes in the input records are reordered before processing to minimize the cost of processing the input records into subregions. For instance, if an attribute in the original input records is an indication of whether a system is powered or not, it may be that all the records with system having the powered set to false have the same label. Therefore, it may be more efficient to handle the powered system indication as the last attribute because there is going to be at most a single active subregion for dimension with this last attribute being false. If it is not the last attribute in the way the input data set records are structured, reordering can be used to achieve this.

As another example, it may be important to order inputs by when they occurred in time even though the timestamp attribute is not specified as the first attribute. By reordering the attributes before sorting and having the pre-sorting treat the timestamp attribute as the first attribute, the sorting is the same as if the input record format placed the timestamp attribute as the first attribute. The generation method uses the same reordering so the generation takes place the same as though times tamp attribute is the first attribute in each input record.

The same approach applies if the pre-sorting uses a different order basis on the attributes. For example, if one embodiment treats the first attribute as the least significant in the pre-sorting process, the re-ordering of attributes may re-order to have the desired effect with this different ordering handled by the generation method, for example making a selected attribute the first attribute, rather than the last.

In one embodiment using bucket partial sorting where the bucketing depends on attribute ordering, the attributes may be reordered to improve performance as above.

In one embodiment, the reordering is achieved by permuting the attributes both for the purpose of pre-sorting as well as generation, rather than actually rewriting all the input records into the revised order before the generation. That is, the reordering is applied on reading an input record as part of pre-sorting and on reading the record input as part of rule generation so it achieves the same generation as if all the input records were rewritten to have the reordered order to the attributes.

In general, a different attribute ordering may be selected based on application knowledge and experimentation that minimizes the number of intermediate active subregions that are generated.

Significant Conflict. The term significant conflict is referred to herein to indicate that the degree of conflict may be measured and controlled on an application basis, allowing for input data records to be incorrect as well as for the boundary geometry restrictions of the boundary-structured rule system to provide better coverage while containing the level of inaccuracy.

A candidate bounding geometry (BG) is significantly contradicted by the set of input records if there are credible input data points in this data set that map into a BG yet have a significantly different label than that associated with the BG yet not close enough to another hyperrectangle to be overridden. More generally, a significant conflict arises when the expanded rule overlaps with a critical number of valid input data set records that have an inconsistent label. This critical number may be one or more, depending on the application. This critical number may also be specific to the attribute A, based on attribute/feature information provided with this data set.

In one embodiment, a significant conflict is defined as a significant difference between the label of the input record and that of the expanded rule. For example in autonomous aircraft, if the expanded subregion has a label indicating a moderate increase in airspeed whereas the input data record indicates has a label indicating a slightly less than moderate increase in airspeed, there is no significant conflict. However, if the input data record indicates a moderate decrease in airspeed, it is a significant conflict.

Attribute/feature information may specify a threshold on this difference that may further differentiate between negative and positive differences. For example, it is more acceptable to have the difference arise with a higher airspeed than a lower airspeed than that specified in the input record. Thus, continuing the autonomous aircraft example, the generated rules have a stall condition indication occurring at a slightly higher airspeed than the one that the aircraft actually stalls at in order to match the rules to the set of input records within the restrictions of the boundary representation and the number of rules desired in the output. After all, in this example, the aircraft should not fly close to stall speed, and should be controlled to get away from stall speed if it even gets close to stall speed. This avoidance of singularity points is common in many other applications as well. Moreover, in many control and classification applications, being approximately right is sufficient because correction normally takes place over subsequent timesteps.

In one embodiment, a categorical attribute is specified as an enumeration of named values, as is conventional. However, the enumerated values may be assigned so that the proximity in the enumeration order has a meaning in the application. The proximity semantics may be indicated in the attribute information for that feature. For example, the functioning state of monitoring equipment may be indicated by the categories of notFunctioning, minimalFunction, baseFunction and fullFunction with the assigned values of 0, 1, 2 and 3 respectively. Therefore, in conflict detection, an input record that indicates minimal function that overlaps with a rule R that indicates baseFunction may override R in the overlap area, similar to a derived rule. In this vein, the attribute information may indicate the preferred conflict resolution. Here, it is better to assume less function rather than more function when the input record indicates a conflict. This allows the generation to, for instance, prefer false positives over false negatives when diagnosing problems. That is, it is better to indicate a fault incorrectly than ignore symptoms and miss a fault.

In one embodiment, conflict resolution operates by collecting conflicting nearby input data points into a conflict subregion, using the same approximation bounds as described earlier. Then, a conflict subregion with too few data points is eliminated and one with sufficient number may cause an existing subregion to be curtailed to resolve the conflict.

A potential conflict between an input record and a base subregion is treated as the input record subregion overriding the base subregion label, as described earlier with restrictive inheritance. Note that this conflict resolution is taking place during the rule generation, not during rule evaluation, as arises with conventional traditional rule conflict resolution.

Multiple Levels of Confirmation. In one embodiment, rather than having just confirmed and unconfirmed, the processing may maintain multiple levels of confirmation with "unconfirmed" corresponding to level 0. After all, "unconfirmed" just means it is not fully supported by input data points. A subregion that is just supported by a small number of data points could be viewed as partially confirmed.

The subregions with different levels of confirmation are expanded and adjusted as above except a higher-level of confirmation may override a lower-level of confirmation. This may be viewed as a generalization of a confirmed subregion overriding an unconfirmed subregion. For instance, a subregion R1 with 100 data points with one label may override a subregion R2 with a different label and just 3 data points. In this case, the subregions associated with different levels of confirmation are retained so that subsequently received data points may adjust the overriding according. To illustrate, continuing the above example, if a subsequent 200 data points map into subregion R2 with its different label, that subregion may rise above R1 in confirmation and then override R1.

Using Feature/Attribute Information in Selection and Conflict Evaluation. The above description assumes that a set of features have been selected and correspond to the values specified in the input records. Various traditional techniques may be used to select the feature values to collect in the set of input records.

Conversely, often, the set of input records available dictate the set of possible features or attributes that may be used. Starting with this set of potential features, it is practical to specify feature fields in the set of input records to ignore as part of the processing. Moreover, if the value of one specific attribute does not make difference in the generated expanded ruleset, it is an indication that this attribute is not providing information gain in the ruleset and may be removed. For example, if an attribute indicates its value makes no difference to the classification, this attribute may be skipped as part of subsequent rule generation, thereby making the subsequence generation and/or regeneration more efficient.

Concurrent Execution. The processes above may be performed in parallel by subdividing the input space into a multiplicity of subregions and have the subregion generation for each subregion be performed in parallel by a separate processor. Then, a final stage of processing is performed to merge subregions across these subregions. If the final stages are performed in parallel, there may be some duplication of generated subregions. However, that result does not change the output of the rule system using this output ruleset. Moreover, duplicate rules may be removed as an optimization.

Figure 14:
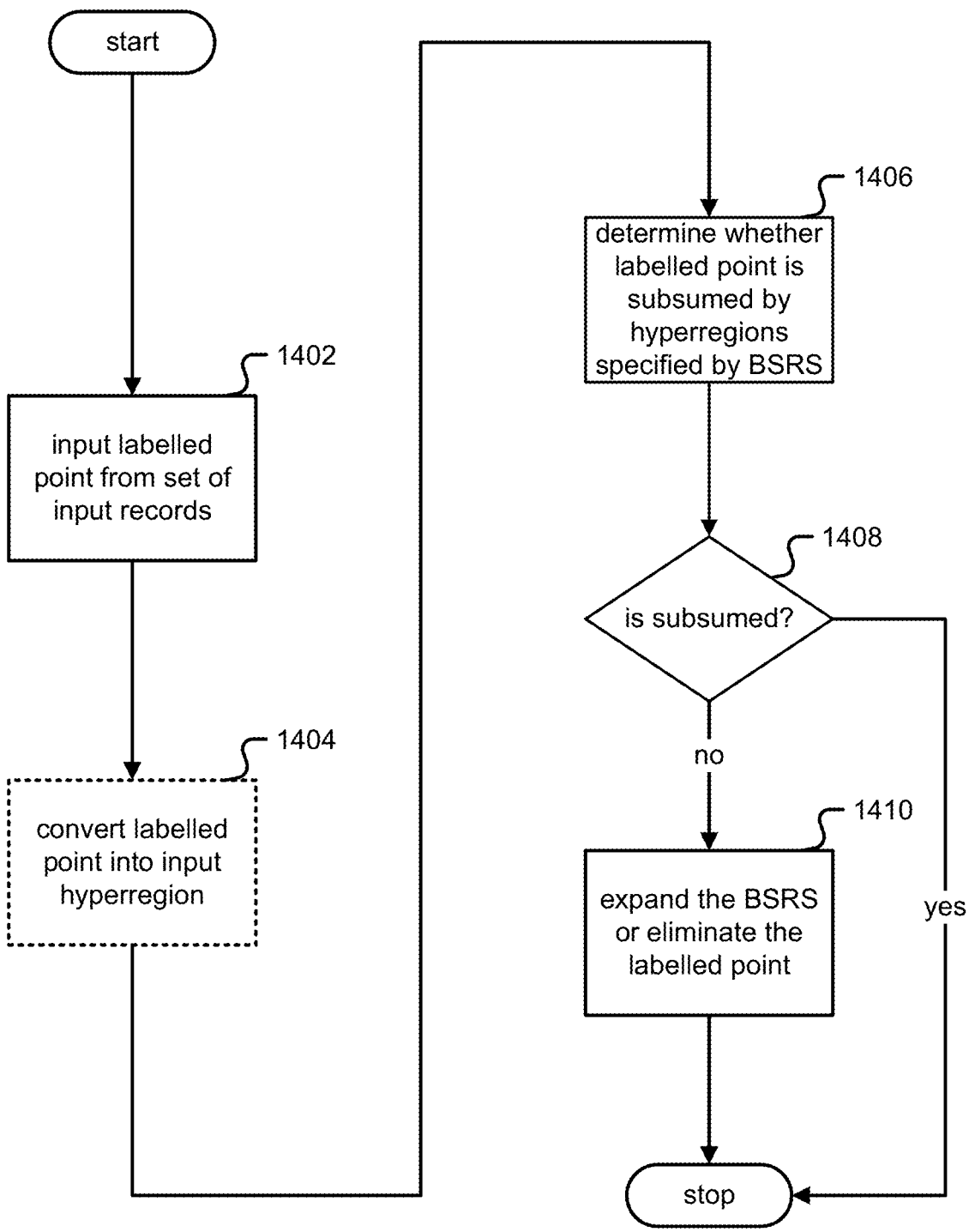
FIG. 14 is a flow diagram illustrating an embodiment of a process for automatic approximating refinement of a ruleset from a labelled data set.

FIG. 14 is a flow diagram illustrating an embodiment of a process for automatic approximating refinement of a ruleset from a labelled data set. In one embodiment, the process of FIG. 14 is processed by the system of FIG. 1.

In step (1402), a labelled point within a multidimensional space is input from a set of input records. In an optional step (1404), the labelled point is converted into an input boundary-structured rule and wherein the steps of determining (1406) and expanding (1410) are applied with this input hyperregion.

In one embodiment, the hyperregion is a multidimensional polytope. In one embodiment, the hyperregion is a hyperrectangle. In one embodiment, the hyperrectangle is an axis-aligned hyperrectangle wherein each edge of the axis-aligned hyperrectangle is parallel to one of the axis of the multidimensional space.

In step (1406), it is determined whether the labelled point and/or input hyperregion is subsumed by a member hyperregion of the set of hyperregions specified by an BSRS, wherein the BSRS includes a boundary-structured rule corresponding to a hyperregion in the multidimensional space. In the event in step (1408) that the labelled point/input hyperregion is not subsumed, then control is transferred to step (1410); otherwise control is transferred to a stop. In step (1410) the BSRS is expanded or the labelled point/input hyperregion is eliminated.

In one embodiment, the BSRS is part of a rule system. In one embodiment, the rule system is a range-structured rule system. In one embodiment, the BSRS comprises base rules that may be overridden by one or more boundary-structured rules generated from the set of input records. In one embodiment, expanding the BSRS comprises expanding with a confirmed/unconfirmed boundary-structured rule pair.

In one embodiment, in a step not shown in FIG. 14, the set of input records is preprocessed. In one embodiment, in a step not shown in FIG. 14, the set of labelled points are grouped within buckets. In one embodiment, in a step not shown in FIG. 14, the set of labelled points are grouped within buckets such that a subset of the set labelled points within at least one threshold range are grouped within a same bucket. In one embodiment, in a step not shown in FIG. 14, the set of labelled points are pre-sorted.

In one embodiment, preprocessing converts the set of input records to contain one or more time sequence of records. In one embodiment, preprocessing comprises at least one of the following: clustering and ordering. In one embodiment, preprocessing comprises organizing the set of input records into clusters, and wherein the determining and expanding comprises processing a subset of clustered labelled points together. In one embodiment, clusters are predefined as subregions of the multidimensional space.

In one embodiment, preprocessing comprises organizing the set of input records into clusters wherein labelled points within a cluster are ordered. In one embodiment, clusters are ordered using lexicographical ordering. In one embodiment, preprocessing comprises a total ordering of the set of input records. In one embodiment, an unconfirmed subregion is maintained, wherein the unconfirmed subregion is an extension of a given subregion that does not conflict with a confirmed subregion. In one embodiment, the extension is a maximum extension.

In one embodiment, in a step not shown in FIG. 14, a ruleset from the set of input records is automatically refined, wherein automatically refining comprises inputting a ruleset and converting the ruleset to a set of expanded hyperregions specified by an expanded boundary-structured ruleset (ERS); for a given input record (IR) in the set of input records: converting the given IR to a corresponding hyperregion; determining if the corresponding hyperregion is subsumed by an expanded member hyperregion of the set of expanded hyperregions specified by the ERS; in an event the corresponding hyperregion is not subsumed, expanding the ERS at least in part by incorporating the corresponding hyperregion or eliminating it; and outputting the ERS as a refined ruleset.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a memory configured to store a boundary-structured ruleset (BSRS), wherein;
   the BSRS is a system with a rule evaluator that is able to determine whether an input data point falls within the bounding geometry specified in the rule antecedents and whether two bounding geometry specifications intersect; and
   the BSRS includes a boundary-structured rule, wherein:
   the boundary-structured rule comprises a rule antecedent that specifies an input bounding geometry that defines and encloses an input hyperregion in an input multidimensional space; and
   the boundary-structured rule comprises a rule consequent that specifies an output bounding geometry that defines and encloses an output hyperregion in an output multidimensional space; and
   a processor configured to:
      input a labelled point within the input multidimensional space from a set of input records;
      determine whether the labelled point is subsumed by a member hyperregion of the set of hyperregions specified by the BSRS; and
      in the event the labelled point is not subsumed, expand the BSRS or eliminate the labelled point.

2. The system of claim 1, wherein the processor is further configured to convert the labelled point into an input hyperregion corresponding to an input boundary-structured rule and wherein the determining and expanding is applied with this input hyperregion.

3. The system of claim 1, wherein the input hyperregion is a multidimensional polytope.

4. The system of claim 3, wherein the input hyperregion is a hyperrectangle.

5. The system of claim 4, wherein the hyperrectangle is an axis-aligned hyperrectangle wherein each edge of the axis-aligned hyperrectangle is parallel to one of the axis of the multidimensional space.

6. The system of claim 1, wherein the BSRS is part of a rule system.

7. The system of claim 6, wherein the rule system is a range-structured rule system.

8. The system of claim 1, wherein the BSRS comprises base rules that may be overridden by one or more boundary-structured rules generated from the set of input records.

9. The system of claim 1, wherein expanding the BSRS comprises expanding with a confirmed/unconfirmed boundary-structured rule pair.

10. The system of claim 1, wherein the processor is further configured to preprocess the set of input records.

11. The system of claim 10, wherein the processor is further configured to group the set of labelled points within buckets.

12. The system of claim 10, wherein the processor is further configured to group the set of labelled points within buckets such that a subset of the set labelled points within at least one threshold range are grouped within a same bucket.

13. The system of claim 10, wherein the processor is further configured to pre-sort the set of labelled points.

14. The system of claim 10, wherein the preprocessing converts the set of input records to contain one or more time sequence of records.

15. The system of claim 10, wherein the preprocessing comprises at least one of the following: clustering and ordering.

16. The system of claim 10, wherein the preprocessing comprises organizing the set of input records into clusters, and wherein the determining and expanding comprises processing a subset of clustered labelled points together.

17. The system of claim 16, wherein clusters are predefined as subregions of the multidimensional space.

18. The system of claim 10, wherein the preprocessing comprises organizing the set of input records into clusters wherein labelled points within a cluster are ordered.

19. The system of claim 18, wherein the clusters are ordered using lexicographical ordering.

20. The system of claim 10, wherein the preprocessing comprises a total ordering of the set of input records.

21. The system of claim 1, wherein an unconfirmed subregion is maintained, wherein the unconfirmed subregion is an extension of a given subregion that does not conflict with a confirmed subregion.

22. The system of claim 21, wherein the extension is a maximum extension.

23. The system of claim 1, wherein expanding the BSRS includes incorporating the labelled point.

24. A computer program product embodied in a non-transitory computer readable medium and comprising computer instructions for:
   inputting a labelled point within a multidimensional space from a set of input records;
   determining whether the labelled point is subsumed by a member hyperregion of the set of hyperregions specified by an BSRS, wherein:
   the BSRS is a system with a rule evaluator that is able to determine whether an input data point falls within the bounding geometry specified in the rule antecedents and whether two bounding geometry specifications intersect; and
   the BSRS includes a boundary-structured rule, wherein:
   the boundary-structured rule comprises a rule antecedent that specifies an input bounding geometry that defines and encloses an input hyperregion in an input multidimensional space; and
   the boundary-structured rule comprises a rule consequent that specifies an output bounding geometry that defines and encloses an output hyperregion in an output multidimensional space; and
   in the event the labelled point is not subsumed, expanding the BSRS or eliminating the labelled point.

25. A method, comprising:
   inputting a labelled point within a multidimensional space from a set of input records;
   determining whether the labelled point is subsumed by a member hyperregion of the set of hyperregions specified by an BSRS, wherein;
   the BSRS is a system with a rule evaluator that is able to determine whether an input data point falls within the bounding geometry specified in the rule antecedents and whether two bounding geometry specifications intersect; and
   the BSRS includes a boundary-structured rule, wherein:

the boundary-structured rule comprises a rule antecedent that specifies an input bounding geometry that defines and encloses an input hyperregion in an input multidimensional space; and the boundary-structured rule comprises a rule consequent that specifies an output bounding geometry that defines and encloses an output hyperregion in an output multidimensional space; and in the event the labelled point is not subsumed, expanding the BSRS or eliminating the labelled point.

26. The method of claim 25, further comprising automatically refining a ruleset from the set of input records, wherein automatically refining comprises:

inputting a ruleset and converting the ruleset to a set of expanded hyperregions specified by an expanded boundary-structured ruleset (ERS);

for a given input record (IR) in the set of input records:
converting the given IR to a corresponding hyperregion;

determining if the corresponding hyperregion is subsumed by an expanded member hyperregion of the set of expanded hyperregions specified by the ERS;

in an event the corresponding hyperregion is not subsumed, expanding the ERS at least in part by incorporating the corresponding hyperregion or eliminating it; and outputting the ERS as a refined ruleset.

\* \* \* \* \*